(12) United States Patent
Shu

(10) Patent No.: US 9,464,643 B2
(45) Date of Patent: Oct. 11, 2016

(54) HELICAL ROTARY ACTUATOR

(76) Inventor: Jianchao Shu, Winston, GA (US)

( * ) Notice: Subject to any disclaimer, the term of this patent is extended or adjusted under 35 U.S.C. 154(b) by 1236 days.

(21) Appl. No.: 13/200,002

(22) Filed: Sep. 15, 2011

(65) Prior Publication Data

US 2012/0079901 A1 Apr. 5, 2012

Related U.S. Application Data

(60) Provisional application No. 61/404,430, filed on Oct. 1, 2010.

(51) Int. Cl.
*F15B 15/06* (2006.01)
*F16H 25/20* (2006.01)

(52) U.S. Cl.
CPC ..... *F15B 15/068* (2013.01); *F16H 2025/2028* (2013.01); *Y10T 74/18568* (2015.01); *Y10T 74/18792* (2015.01)

(58) Field of Classification Search
CPC ............................ F15B 15/068; E05F 15/54
USPC ........... 92/33; 74/89.24, 32, 34, 89.16, 22 R, 74/23, 22 A, 89.35, 424.82
See application file for complete search history.

(56) References Cited

U.S. PATENT DOCUMENTS

| | | | |
|---|---|---|---|
| 1,056,616 A | 3/1913 | Wright | |
| 2,791,128 A | 5/1957 | Geyer | |
| 3,255,806 A | 6/1966 | Meyer | |
| 3,393,610 A | 7/1968 | Aarvold | |
| 3,961,559 A * | 6/1976 | Teramachi | F15B 15/063 91/189 R |
| 4,089,229 A | 5/1978 | Geraci | |
| 4,745,847 A * | 5/1988 | Voss | F01B 11/00 277/346 |
| 4,858,486 A | 8/1989 | Weyer | |
| 4,882,979 A * | 11/1989 | Weyer | F15B 15/068 251/229 |
| 6,212,889 B1 * | 4/2001 | Martin | F15B 15/068 60/602 |
| 6,793,194 B1 | 9/2004 | Grinberg | |
| 2009/0095099 A1* | 4/2009 | Konomoto | F15B 15/068 74/89.35 |

OTHER PUBLICATIONS

Helac L100 Series Brochure, p. 1,2 Helac Corporation 225 Battersby Avenue Enumclaw, WA 98022 USA.
BHH and BL Series Hydraulic Actuators—Double-Acting or Spring-Return, Bettis BHH and BHHF 18703 GH Circle, PO Box 508, Waller, Texas 77484 USA.
Rotary actuator designs, Technology Zones, Hydraulics and Pneumatics magazine, hydraulicspneumatics.com.

* cited by examiner

*Primary Examiner* — Thomas E Lazo
*Assistant Examiner* — Abiy Teka

(57) ABSTRACT

This invention relates to a novel helical dual-center engagement converting mechanism and its applications in fluid-powered actuation system, more particularly to a highly reliable, simple, powerful and balanced and less expensive helical rotary actuator. This actuator comprises a self-balanced linear/rotary dual-center engagement converter, compact porting systems and easy manufacturing modules and various bodies and shaft interface with other components. This actuator also provides a rotary position control and backlash eliminating mechanism to meet various requirements with lighter weight, smaller size and higher accuracy of position and can be interfaced with different machines, such as subsea valves, earthmoving equipment, construction equipment, lifting equipment, landing gears, militarily equipment and medical devices, robotic and artificial leg and arm joints.

2 Claims, 23 Drawing Sheets

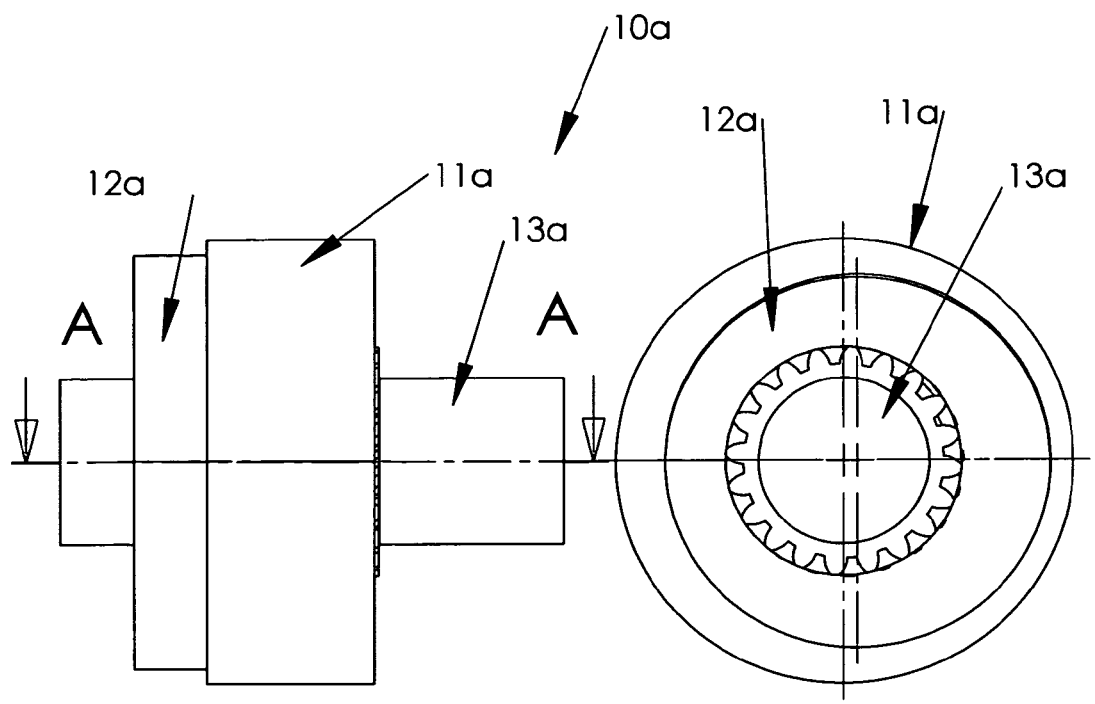
FIG.2  FIG.3
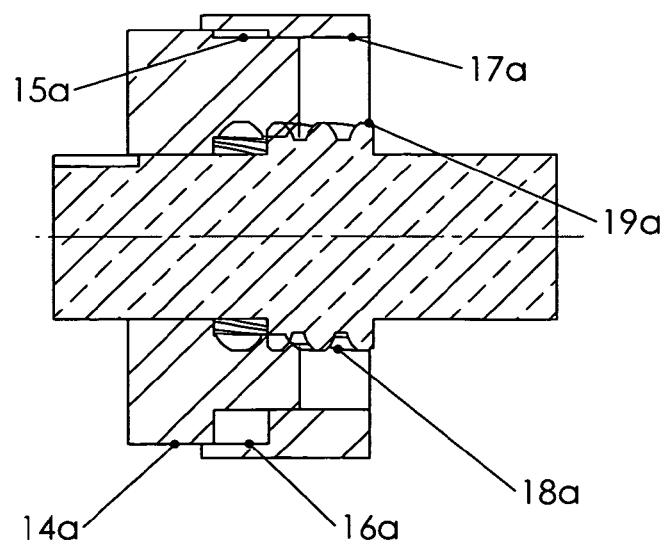
FIG.4

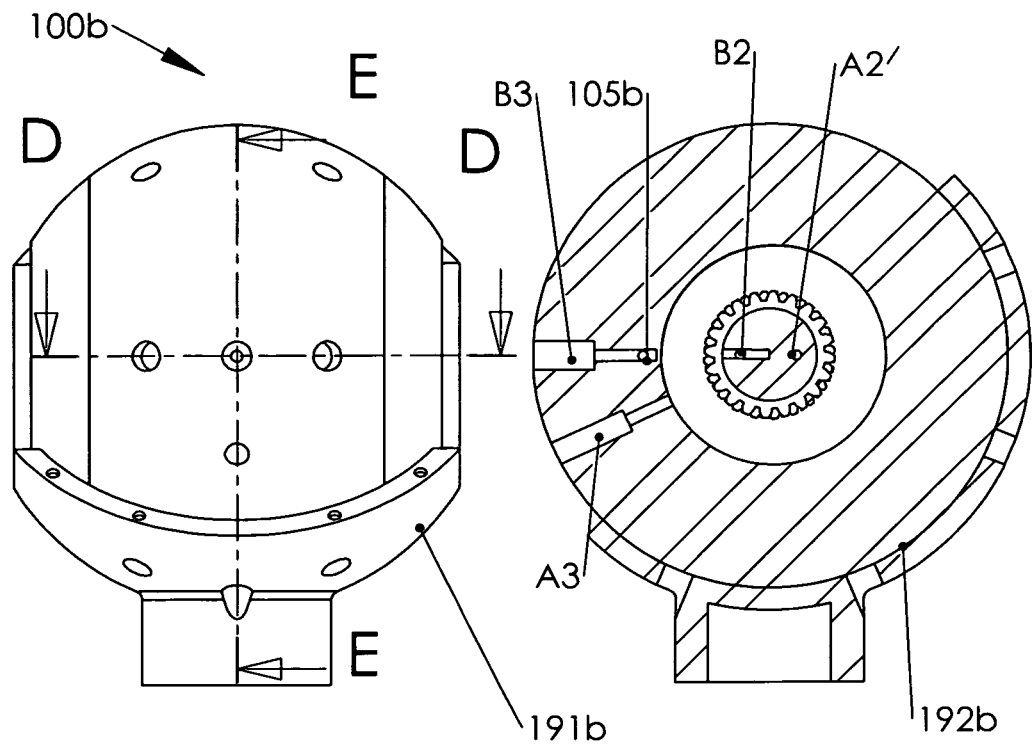
FIG.16
FIG.17
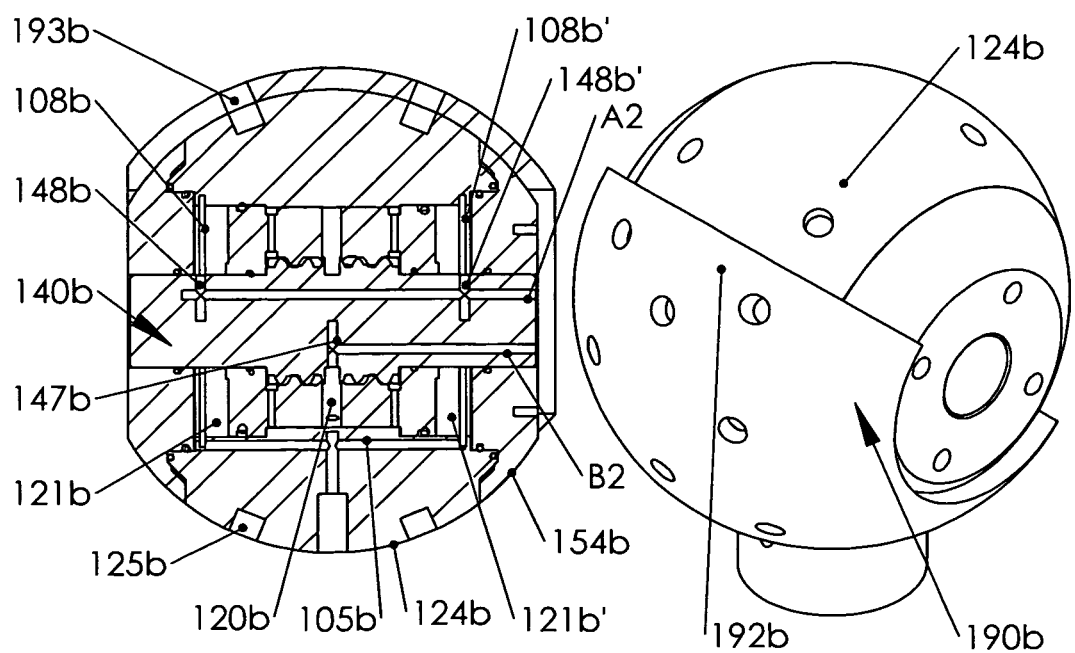
FIG.18
FIG.19

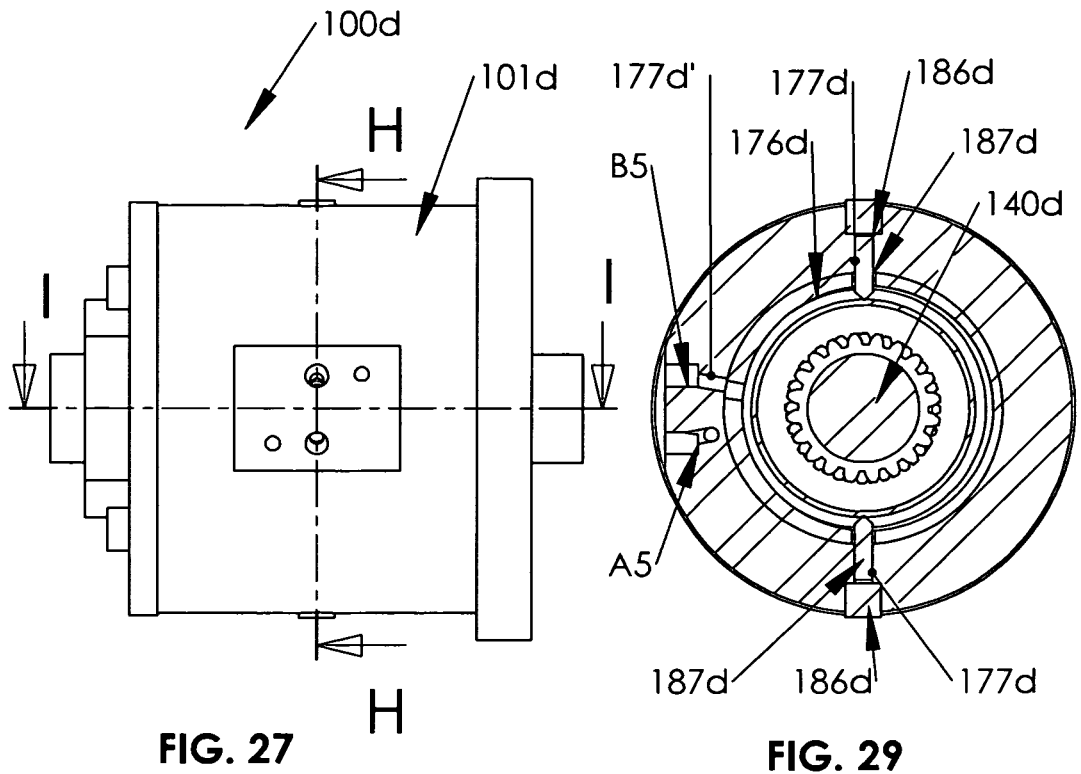
FIG. 27
FIG. 29
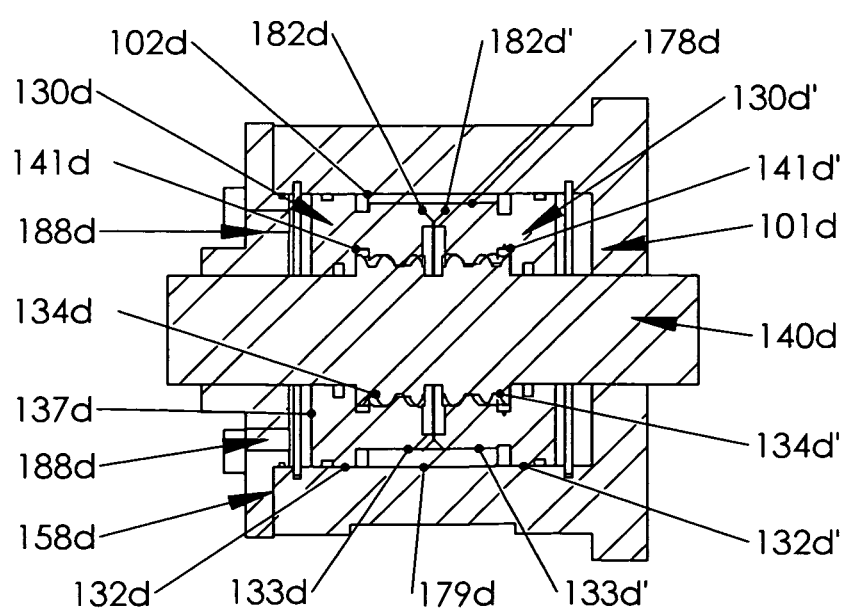
FIG. 28

HELICAL ROTARY ACTUATOR

CROSS-REFERENCE TO RELATED APPLICATIONS

This application claims the benefit of provisional patent application Ser No. 61/404,430 filed on Oct. 1, 2010 by Jianchao Shu

FEDERALLY SPONSORED RESEARCH

No

SEQUENCE LISTING OR PROGRAM

No

BACKGROUND

This invention relates to a novel helical dual-center engagement converting mechanism and its applications in fluid-powered actuation system, more particularly to a highly reliable, simple, powerful and balanced and less expensive helical rotary actuator. This actuator comprises a self-balanced linear/rotary dual-center engagement converter, compact porting systems, easy manufacturing modules, various body configuration and shaft interfaces with other components. This actuator also provides a rotary position control and backlash eliminating mechanism to meet high precision requirements with lighter weight, smaller size and higher accuracy of position and can be interfaced with different machines, such as subsea valves, earthmoving equipment, construction equipment, lifting equipment, landing gears, militarily equipment and robotic and medical devices, artificial arm and leg joints.

Conventional fluid-powered helical actuators have been used in many industries for years, it is based on an old helical linear/rotary converter mechanism and includes a cylindrically shaped housing and two moving parts: a shaft and an annular piston. Helical spline teeth machined on the shaft engage a matching complement of splines on an inside diameter of the piston, an outside diameter of the piston carries a second set of helical splines that engages a ring gear integral with the housing. While conventional linear pistons with pivot joint, the rack and pinion and vane actuators still have majority market share over the helical rotary actuators, the reason is that conventional fluid-powered helical rotary actuators have many unsolved problems and disadvantages; (1) low efficiency, about 60%-70% efficiency for helical rotary actuator is in comparison with that of 90 to 98% for the rack and pinion or vane actuators, so it prevents the actuator from low pressure applications, there are fewer helical pneumatic actuators in the market in comparison with rack and pinion and vane actuators, it not only wastes lot of materials and energy but also can not be used for limited space or restrict weight applications (2) high unbalanced thrust, the unbalanced thrust is still an unsolved problem, it requires more internal parts to balance the thrust, so length of actuator becomes very longer, size of the actuator becomes bigger even there are some balanced helical actuators in the prior art, none of the trials has been commercial success (3) backlashes, due to cumulative clearances of two sets of helical teeth engagements, it increases the impact on the teeth and reduces the accuracy of moving position, life of actuator, some efforts were made in the prior art, but none of trials has been commercial success (4) high stress concentration on cylindrical bodies with helical teeth either by pinging, welding or integrating, it has been struggled for years to seek the solution, under high pressure 3000-5000 psi, the root of helical teeth on cylindrical body generates high stress concentration, this structural problem not only reduces the load capacity and increase the actuator size and weights, but also it can cause sudden break down based on Paris law and is considered to be unreliable and unsafe for critical operations where linear piston with pivot joint devices which have the same rotation function still play a key role in earthmoving equipment and landing gears (5) restrict installation position, most helical actuators are designed for either vertical or horizontal position, they are not suitable for any position between them, due to lack of proper structure and bearing (6) lack of position control, due to lack of control of rotary position and fail to close or open function, it prevents the actuator from critical applications such as military equipment, robotic devices and valve control (7) lack of interface function, most of the actuator bodies are cylindrical shape, such a shape is difficult for three dimensional joint (8) low reliability, according to Failure Modes and Effects Analysis (FMEA), a piston with internal and external helical teeth has the highest severity, with lack of redundancy, the conventional helical actuator never can compete with linear piston with pivot joint in critical applications like landing gears (9) structural inferiority (a) most cylindrical body can not sustain high structural bending load and compression load, it prevent it from those applications like rotation with high bending or compression (b) material incomparability, since material requirement of mechanical property for body is very different from that of teeth, for the body, it requires high strength, ductile, while for the teeth, high hardness and wearing resistance are the key requirements, since the helical teethes are a part of the body, so most designs are to put the body strength first and to scarify teeth design, as a result the teeth with soft surface will be damaged first or wore out fast even with hydraulic fluid (10) difficult and expensive manufacturing, it is difficult and expensive to make helical teeth, specially internal helical teeth or internal splines on the body as an integral part, it not only makes the manufacturing process more difficult if not impossible, it is impossible to replace the teeth alone, since there is no modulization design in the actuator, conventional actuator manufacturing require large inventory for each size actuator (11) inlet and outlet ports are far away and not standardized, so it is difficult to connect the ports, especially in case of counterbalanced valve is required, additional tube and adapter is needed, it not only increase cost but also reduce reliability, any addition joint adapter and tube can cause leak.

In order to overcome the disadvantages or solve the problems of the conventional fluid-powered helical rotary actuators, many efforts have been made in the prior arts. There are four approaches to improve the conventional helical actuators in the prior arts, but those approaches work against each other within a limited scope.

The first approach is to improve the conversion mechanism. U.S. Pat. No. 3,255,806 to Kenneth H. Meyer (1966), U.S. Pat. No. 4,089,229 to James Leonard Geraci (1978) show a approach is to use a number of keys and keyway to prevent the piston sleeve from rotation under linear force, this conversion mechanism did work, but there were two drawbacks, one is to waste large internal body space due to the keyway, the other is to cause high stress concentration on the body, under 3000-5000 psi pressure, such stress condition is unsafe and prohibited, likewise other actuators are provided with splined design to prevent the piston from rotation for valve actuations, in addition, it is expensive to make, so many other solutions came out like U.S. Pat. No. 1,056,616 to C. E Wright (1913), U.S. Pat. No. 6,793,194 B1 to Joseph Grinberg (2004) the approach is to use two bars to prevent piston sleeve from rotation, the drawback is to waste a large interior housing space and it is restricted to smaller actuator applications, finally current widely acceptable helical actuator is shown in U.S. Pat. No. 3,393,610 to R. O. Aarvold (1966) disclosed a device with a pair helical gearing means between a housing and a shaft in an opposite direction, but it did not prevent the piston rotation, rather it is used as medium to generate a reaction torque between the housing and the shaft and in turn to rotate the shaft, the drawback is to waste internal space and more energy to rotate the piston and increase backlash and cost, a desirable design for this conversion mechanism is that only rotary part should be a rotary shaft, not a body or a piston, moreover the additional rotation will wear bearings and o rings faster and more than under a linear movement only, in addition the arrangement greatly restricts an engaged diameter of the piston, as a result, the output torque is greatly reduced, again, high stress concentration on the body still exists, even it become more difficulty to manufacture with internal and external teeth in a piston.

The second approach is to balance thrust force and ease consequences of the unbalanced forces on helical actuators, U.S. Pat. No. 3,255,806 to Kenneth H. Meyer (1966) shows an actuator with two actuator assembled in an opposite teeth and direction, the design become more difficulty for machining the keyways on the longer body, other effort made is shown on U.S. Pat. No. 4,745,847 to Julian D. Voss (1988) discloses a new design with four parts; a shaft, a housing, a linear piston, a rotation piston, it causes more leak paths and make the actuators more complicated and less reliable, finally U.S. Pat. No. 3,393,610 to R. O. Aarvold (1966) shows two sets of helical teeth in an opposite direction on a piston, it balances the thrust force on the piston but not on the shaft or housing, this arrangement causes a constant tension on the piston during linear/rotary converting, so the piston is subject to torsion well as tension while the load is still applied to shaft and housing, as a result the size of piston is increased while the housing and shaft are underused, so far there is no successful full balance design in the market.

The third approach is to simplify the manufacturing process, there is few development in the field, the most internal helical teeth are as an integral part of a housing or shaft, few welding process or pining process have been tried, but for the current pressure vessel safety standards, those practices under 3000-5000 psi pressure are considered to be unsafe, so stronger, heaver body or shaft with a integral helical teeth are only the solution for now, there is no improvement in the filed The fourth approach is to ease the backlash and improve performances of the actuator, a typical example is shown in U.S. Pat. No. 2,791,128 to Howard M. Geyer (1957) and U.S. Pat. No. 4,858,486 to Paul P. Meyer (1989), a complex mechanical adjustable devices are introduced, but in most applications, such a design is considered to be impractical or too costly due to inherent disadvantage of clearance of two set of helical teeth, the fundamental adjustment mechanism is still unchanged.

So the fluid-powered actuation industry has long sought means of improving the performance of fluid-powered actuation system, eliminating the unbalanced thrust increate efficiency, increate integrity of the body strength, and increasing reliability and accuracy rotary position with less cost.

In conclusion, insofar as I am aware, no fluid-powered actuation system formerly developed provides higher system performances with a modularization structure, less parts, highly efficient, versatile, reliable, easy manufacturing at low cost.

SUMMARY

This invention provides a simple, highly reliable, modular, compact, efficient and balanced rotary actuator. This actuator comprises a novel and improved helical linear/rotary converting modules, compact porting systems and shaft/body interface modules and is much simpler for manufacturing and assembly. It is constructed as converting modules and shaft/body modules, which are easily connected to various components. It also provides rotary position controllers for 90, 180 or 360 degrees with no backlash and lighter weight, smaller space and higher accuracy of position and can be used for a combination device of a hinge and rotary actuator or a rotary actuator either under high axial load or gravity load between vertical and horizontal positions, or for quick cycle, high vibration, quick opening or closing applications and other critical applications to replace linear pistons with pivot joint devices or landing gears for aircraft or artificial or robotic leg and arm joints The helical linear/rotary converting module can be constructed as a body, a converting unit and a shaft, the converting unit can be constructed as one piston having a two-center linear engagement means and a helical rotary engagement means with the body and the shaft, the two-center linear engagement means is constructed as a pair of a centric and eccentric section which are engaged with a centric bore and eccentric bore between the converting piston and the body or shaft, the helical rotary engagement means is constructed with a pair of helical converting means which includes spline teeth engagement, spline groove/pin and teeth engagement with balls between the converting piston and the body or the converting piston and the shaft, the converting unit can be constructed as two pistons have two pairs of the linear engagement means and rotary engagement means located and moved in an opposite direction. The body can be constructed as one piece a body or two piece split bodies, while shaft can be constructed as one pieces part with helical rotary converting means or two-center linear converting means or multiple pieces parts. The actuator includes various shapes of bodies for different applications.

The actuator can be constructed with various shape of bodies, the spherical shape of the body is constructed for supporting high axial load both on the shaft or body or installed between vertical and horizontal positions and sustain high bending and compression loads or with robotic and artificial arm and leg joints, other shape of body is provided with one end closed and other end opened for operating rotary valve, finally a split body is constructed to receive large engaged diameter of piston with smaller end shaft or large spring to generate return force.

The actuator can be constructed with position control devices. One of the feature is to combine a vane actuator and helical actuator as one unit, it not only eliminate backlash but increase output torque and improve the accuracy of rotary position, other is to provide two hard adjustable hard stop in both ends of rotation of 90, 180, 270 or 360 degree. In the manufacturing of the actuator, this invention provides other joint method to separate helical teeth from shaft or body, so the helical teeth can be manufactured replaced easily at low cost.

Accordingly, besides objects and advantages of the present invention described in the above patent, several objects and advantages of the present invention are:
(a) To provide a highly efficient linear/rotary converting mechanism with less energy, maxim output torque and fewer components.
(b) To provide a linear/rotary converting mechanism with less stress concentration, so the mechanism can be more reliable, compact and still robust for critical applications
(c) To provide a fluid-powered actuation system with highly optimal division of functions among the modular members in a balanced manner, so such a system allows a user to have higher integrity of a system with fewer components and reduce a system space, leakage and manufacturing and replacement cost
(d) To provide a directly coupling means for an actuator and other components so as to eliminate adapters, reduce the space for their connection.
(e) To provide a fully balanced means for an actuator, so the actuator is constructed with more powerful and reliable mechanism with less weight, parts and cost.
(f) To provide a fluid-powered actuation system with actuator, which has less displaced fluid volumes on both sides of pistons, so the energy loss can be reduced to a minimum level
(g) To provide an internal porting means for a fluid-powered actuation system, the system is not subject to external tube corrosion and breakdown and has quick response time and can be either connected through a shaft or body.
(h) To provide a fluid-powered actuator with high holding torque, so it is not susceptible to vibration and more stable and can be used in applications of high vibration, quick cycle.
(i) To provide a fluid-powered actuation system with gravity balance mechanism, so the actuator can be used between vertical and horizontal positions.
(j) To provide a fluid-powered actuation system without backlash, so the system becomes more stable and accurate at pre-setting position
(k) To provide a fluid-powered actuation system with highly reliable, inherently redundant, intrinsically safe control functions, so the system can be used for critical applications such as military operation, medical emergence care/ device and aircraft landing gears
(l) To provide a produced-friendly, fluid-powered actuation modules with simple, flexible structures, easy manufacturing and process and various size and material selection, the modules require simple manufacturing process and flexible construction methods for different applications, so a manufacturer for the system can easily implement rapid product development and outsourcing at lower cost
(m) To provide a linear-rotary converting device with compact, adaptable rotary shaft and body. Therefore, the devices can use as a combination of a hinge joint and rotary actuator for robotic or artificial arm and leg joints.

Still further objects and advantages will become apparent from study of the following description and the accompanying drawings.

DRAWINGS

Drawing Figures

FIG. 2 is a front view of helical linear/rotary converting mechanism of FIG. 1.

FIG. 3 is a side view of helical linear/rotary converting mechanism of FIG. 1.

FIG. 4 is a cross sectional views of helical linear/rotary converting mechanism of FIG. 2 along line A-A.

FIG. 16 is a front view of the helical rotary actuator of FIG. 15.

FIG. 17 is a cross sectional view of the helical rotary actuator of FIG. 16.
along line E-E.

FIG. 18 is a cross view of the helical rotary actuator of FIG. 16.
along line D-D.

FIG. 19 is an isometric view of the helical rotary actuator of FIG. 16.

FIG. 27 is a front view of the helical rotary actuator of FIG. 26.

FIG. 28 is a cross sectional view of the helical rotary actuator of FIG. 27 along line I-I.

FIG. 29 is a cross sectional view of the helical rotary actuator of FIG. 27 along line H-H.

Figure 1:
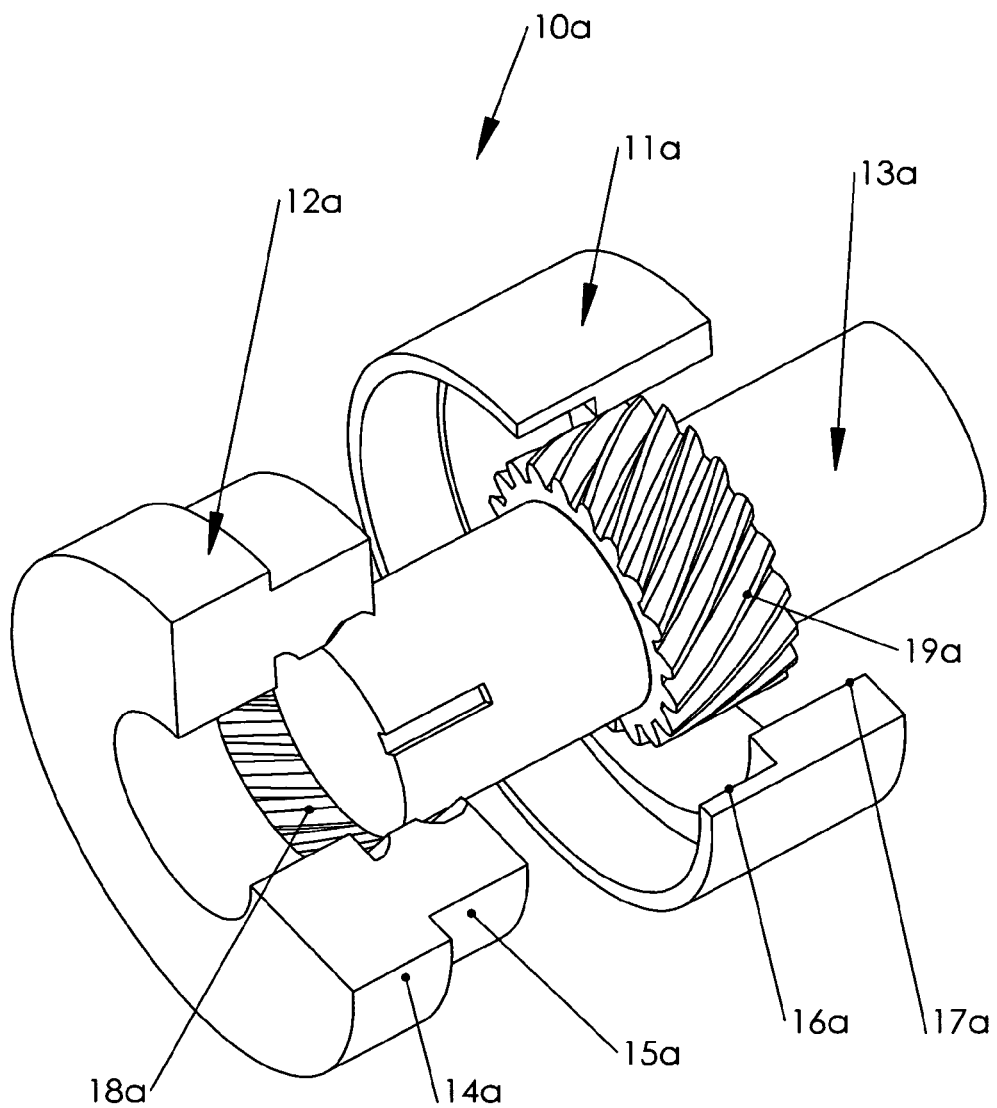
FIG. 1 is an exploded, quarter cut view of a helical linear/rotary converting mechanism constructed in accordance with this invention.

| Reference Number In Drawing | |
|---|---|
| 10 Single Helical Converter a, b, c, d, e, f, h | 20 Double Helical converter a, b, f |
| 11 body a, b, c, d | 21 Body, a, b, f |
| 12 Converting piston, a, b, c, d | 22, 22' Converting piston a, b, f |
| 13 Shaft, a, b, c, d, e, f, g, h | 23 Shaft, a, b, f |
| 14 Centric section, a, b, c, d | 24 Centric section a, b, f |
| 15 Eccentric section, a, b, c, d | 25, 25' Eccentric section a, b, f |
| 16 Centric bore, a, b, c, d | 26, 26' Centric bore a, b, f |
| 17 Eccentric bore a, b, c, d | 27, 27' Eccentric bore a, b, f |
| 18 Helical internal teeth, a, b ,d | 28, 28' Helical internal teeth a, b, f |
| 19 helical external teeth, a, b, d | 29, 29' Helical external teeth a, b, f |
| 18 Helical groove, c | |
| 19 Helical groove pin, c, | |
| 1 Support ring e, f, g, h | 9 Retaining ring g |
| 4 Centric section, e, f, g, h | 2 Helical teeth ring, e, f, g, h |
| 5 Eccentric section, e, f, g, h | 3 Shaft e, f, g, h |
| 6 Centric bore e, f, g, h | 7 Eccentric bore, e, f, g, h |
| | 8 Set of Balls |
| 100 Helical Actuator, a, b, c, d, e, g | |
| A port, 1, 2, 3, 4, 5, 6, 7 | 130'', 130 Converting piston |
| B Port, 1, 2, 3, 4, 5, 6, 7 | 131', 131 Groove |
| 101', 101 Body, | 132', 132 Centric section |
| 102', 102 Centric bore, | 133', 133 Eccentric section |
| 103', 103 Eccentric bore | 134', 134 Internal helical teeth |
| 104', 104 body end | 135', 135 External helical teeth |
| 105 Horizontal Passageway | 136', 136 Piston inward surface |
| 106 Spherical external surface | 137', 137 Piston outward surface |
| 107 Cylindrical External surface | 138', 138 Link hole |
| 108', 108 Groove | 139', 139 bore |
| 109', 109 End Vertical surface | |
| 110', 110 End Horizontal surface | 150 Spherical Cover |
| 111 End Spherical surface | 151 Spherical internal surface |
| 112 Out-vertical surface | 152 Out-Vertical surface |
| 113 Horizontal surface | 153 Horizontal surface |
| 117 Inter-vertical surface | 154 Spherical external surface |
| 120 Center chamber | 155 End Vertical surface |
| 121', 121 Side chamber, | 156 Shaft hole |
| 122', 122 Helical internal teeth right | 157 Inter-Vertical surface |
| 123', 123 Helical internal teeth left | 158 Flat cover |
| 124 Spherical external surface | 159 O ring groove |
| 125 Thread hold | |
| 126 Bolt hole | 170 Vane cover |
| 127 hole | 171 Vane |
| 128 hole | 172 Piston land |
| 129 O ring groove | 173 Inward port |
| 140 Shaft | 174 Outward port |
| 141', 141 External helical teeth, | 175 vane Key |
| 142 | 176 Middle ring |
| 143 Centric section | 177 hole |
| 144 Eccentric section | 178 Inside surface |
| 145', 145 end | 179 Outside surface |
| 146 keyway | 197 Link port |
| 147 center hole | 198 recess |
| 148', 148 Side hole | 180 Conical step |
| 160 O ring | 181 Conical surface |
| 161 O ring | 182 Conical surface |
| 162 O ring | 183 Vane chamber |
| 163 O ring | 184 Vane chamber |
| 164 O ring | 185', 185 Slot |
| 165 Spherical bearing | 186 plug |
| 166 bolt | 187 setscrew |
| 190 Spherical supporter | 188 Flat screw |
| 191 Shell plate | 189 spring |

-continued

| Reference Number In Drawing | |
|---|---|
| 192 Recess surface | 195 Vane land |
| 193 Thread hole | 196 groove |

DESCRIPTION

FIGS. 1-4 illustrate a helical linear/rotary converting mechanism 10a constructed in accordance with the present invention. The mechanism 10a comprises a body 11a, a converting piston 12a and a shaft 13a for converting reciprocal movements of piston 12a to rotary movements of shaft 13a. Body 11a includes a centric bore 16a and an eccentric bore 17a parallel to centric bore 16a, converting piston 12a is movably disposed in body 11a and has a centric section 14a engaged with centric bore 16a and an eccentric section 15a engaged with eccentric bore 17a, shaft 13a movably positioned in converting piston 12a has external helical teeth 19a, converting piston 12a has an internal helical teeth 18a engaged with external helical teeth 19a Referring to FIG. 5, a helical linear/rotary converting mechanism 10b based on mechanism 10a comprises a body 11b, a converting piston 12b and a shaft 13b for converting reciprocal movements of piston 12b to rotary movements of shaft 13b. Body 11b includes internal helical teeth 18b, converting piston 12b is movably disposed in body 11b and has external helical teeth 19a engaged with internal helical teeth 18b, shaft 13b movably disposed in converting piston 12b has a centric section 14b and an eccentric section 15b parallel to centric section 14b, converting piston 12b has a centric bore 16b engaged with centric section 14b and an eccentric bore 17b engaged with eccentric section 15b.

Figure 6:
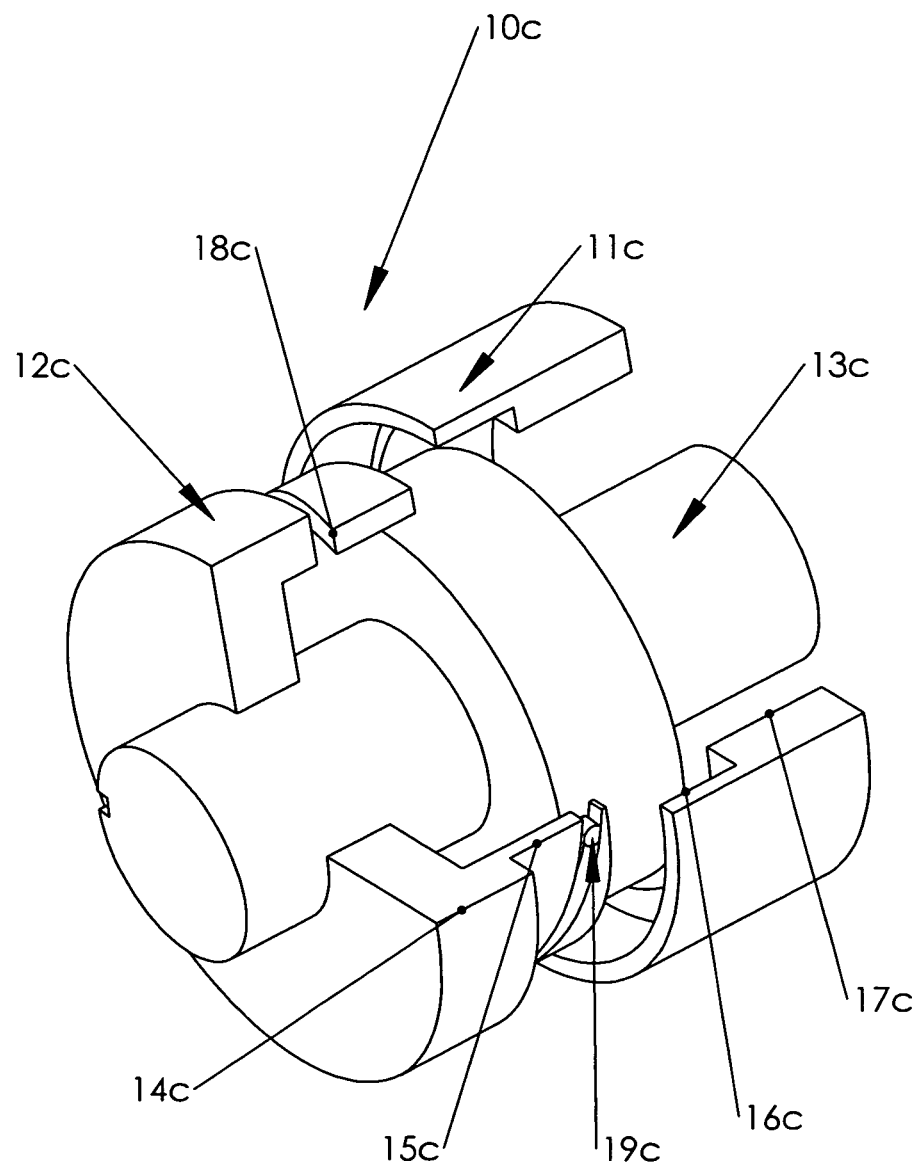
FIG. 6 is an exploded, quarter cut view of an alternative embodiment of helical linear/rotary converting mechanism of FIG. 1.

Referring to FIG. 6, a helical linear/rotary converting mechanism 10c based on mechanism 10a comprises a body 11c, a converting piston 12c and a shaft 13c for converting reciprocal movements to rotary movements. Body 11c includes a centric bore 16c and an eccentric bore 17c parallel to centric bore 16c, converting piston 12c is movably disposed in body 11c and has a centric section 14c engaged with centric bore 16c and an eccentric section 15c engaged with eccentric bore 17c, shaft 13c movably positioned in converting piston 12c has a pin 19c, converting piston 12c has a helical grooves 18c engaged with pin 19c.

Figure 7:
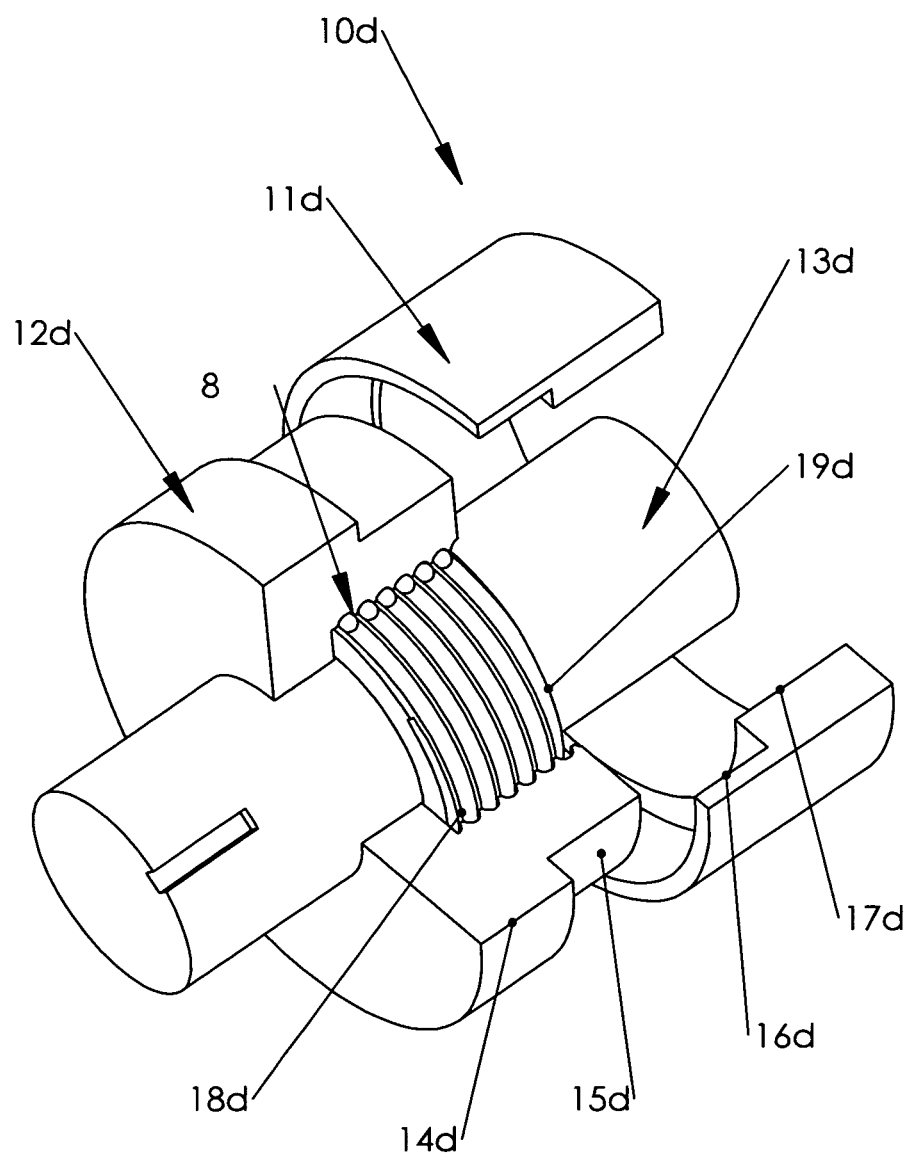
FIG. 7 is an exploded, quarter cut view of an alternative embodiment of helical linear/rotary converting mechanism of FIG. 1.

Referring to FIG. 7, a helical linear/rotary converting mechanism 10d based on mechanism 10a comprises a body 11d, a set of balls 8, a converting piston 12d and a shaft 13d for converting reciprocal movements to rotary movements. Body 11d includes a centric bore 16d and an eccentric bore 17d parallel to centric bore 16d, converting piston 12d is movably disposed in body 11d and has a centric section 14d engaged with centric bore 16d and an eccentric section 15d engaged with eccentric bore 17d, shaft 13d movably positioned in converting piston 12d has external helical teeth 19d, converting piston 12d has internal helical teeth 18d engaged with helical teethes 18d by means of balls 8.

Figure 8:
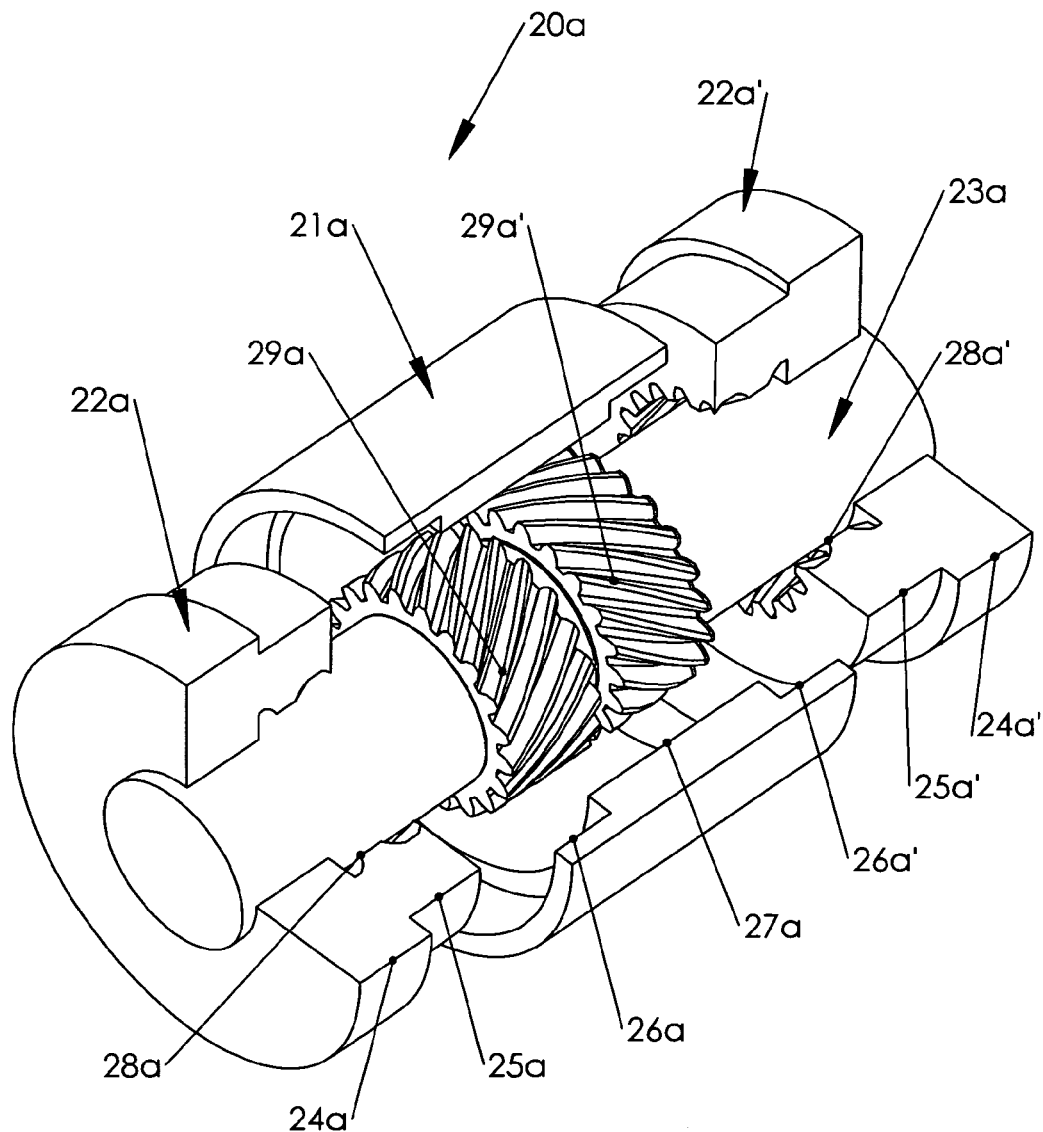
FIG. 8 is an exploded, quarter cut view of an alternative embodiment of helical linear/rotary converting mechanism of FIG. 1.

Referring to FIG. 8, a helical linear/rotary converting mechanism 20a based on mechanism 10a comprises a body 21a, two converting pistons 22a,22a' and a shaft 23a for converting reciprocal movements to rotary movements. Body 21a includes two centric bores 26a, 26a' and an eccentric bore 27a parallel to centric bores 26a, 26a', converting piston 22a is movably disposed in a left side of body 21a and has internal left helical teeth 28a, a centric section 24a engaged with centric bore 26a and an eccentric section 25a engaged with eccentric bore 27a, converting piston 22a' is movably disposed in a right side of body 21a and has internal right helical teeth 28a', a centric section 24a' engaged with centric bore 26a' and an eccentric section 25a' engaged with eccentric bore 27a, shaft 23a is movably positioned in converting pistons 22a,22a' and has external left helical teeth 29a engaged with helical teeth 28a and external right helical teeth 29a' engaged with teeth 28a'.

Figure 9:
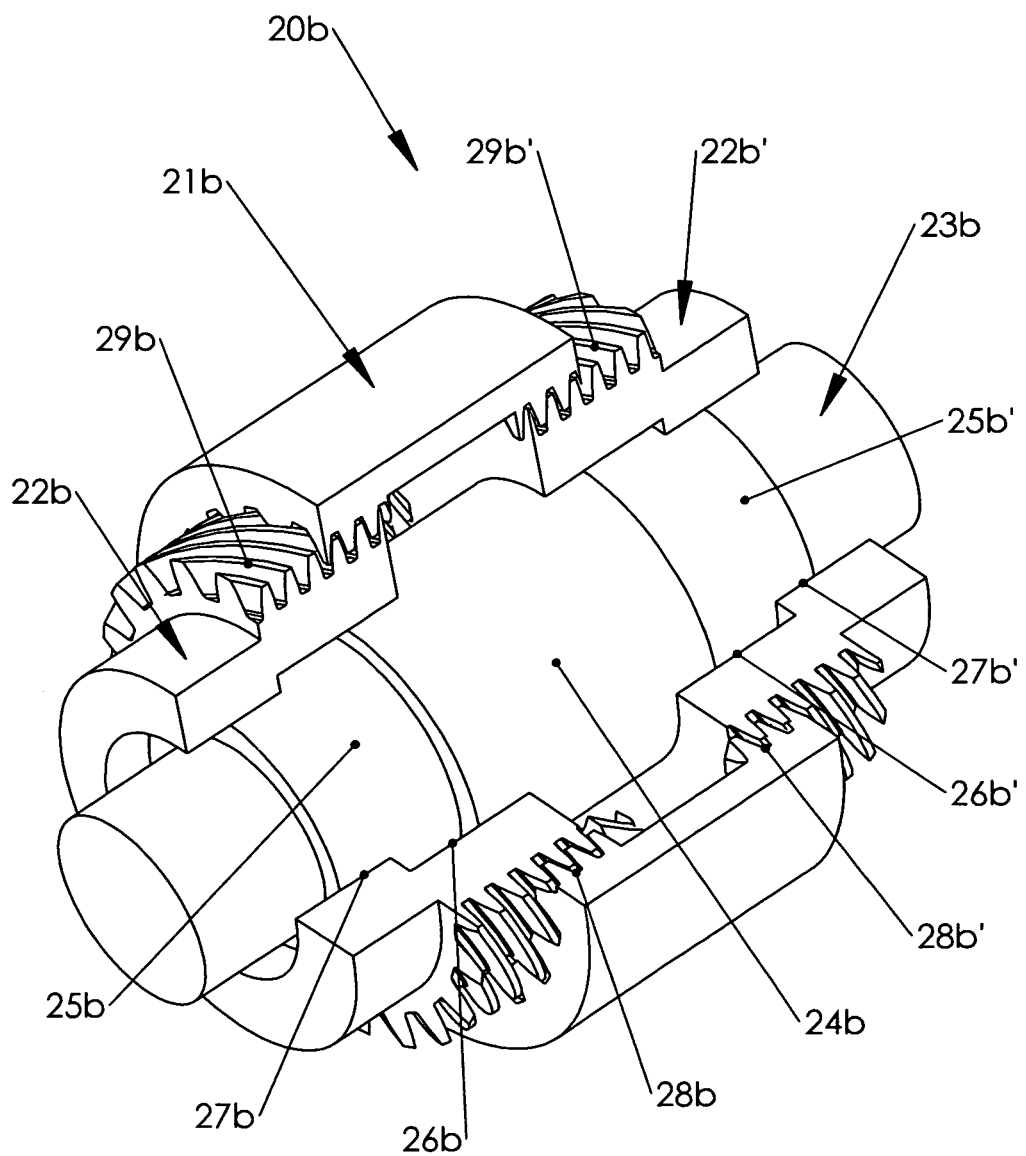
FIG. 9 is an exploded, quarter cut view of an alternative embodiment of helical linear/rotary converting mechanism of FIG. 1.
Figure 10:
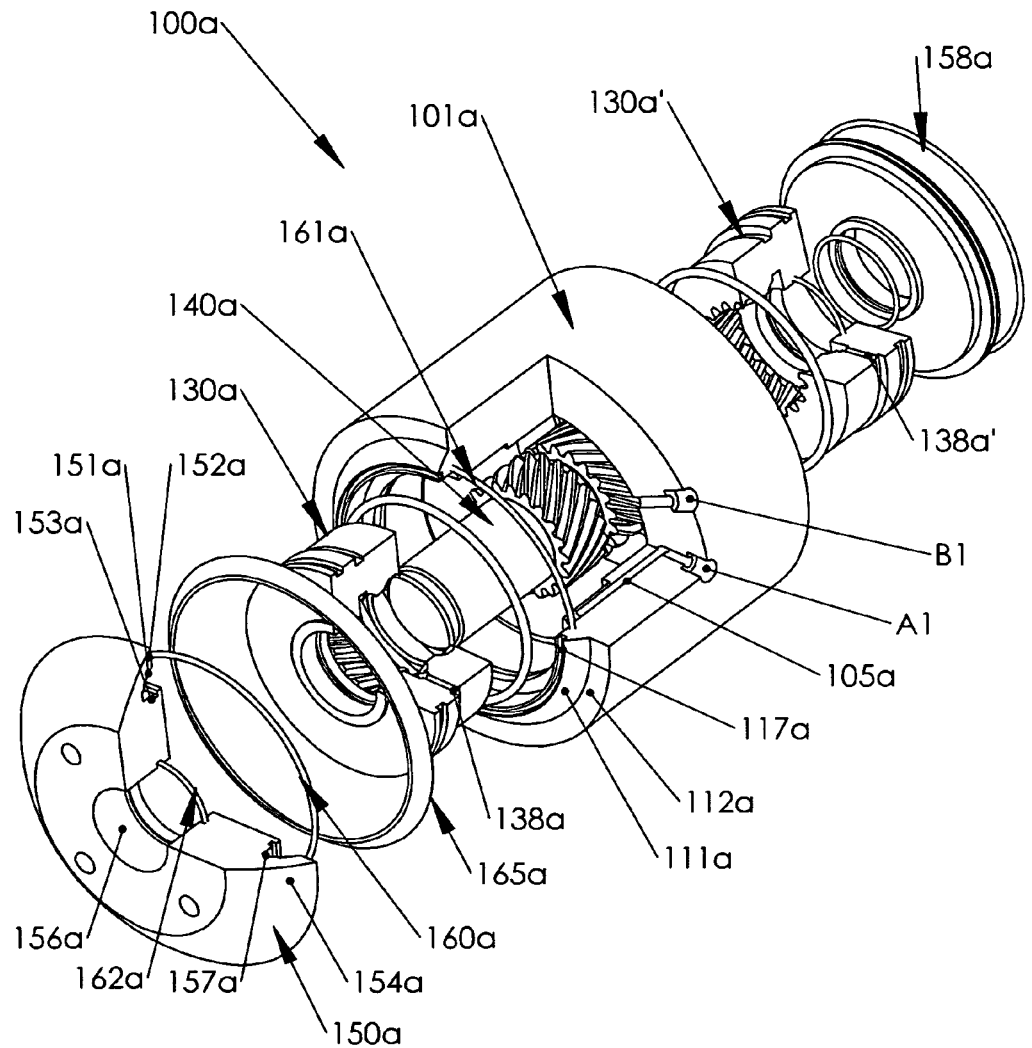
FIG. 10 is an exploded, quarter cut view of a helical rotary actuator embodiment of the helical linear/rotary converting mechanism of FIG. 8.
Figure 11:
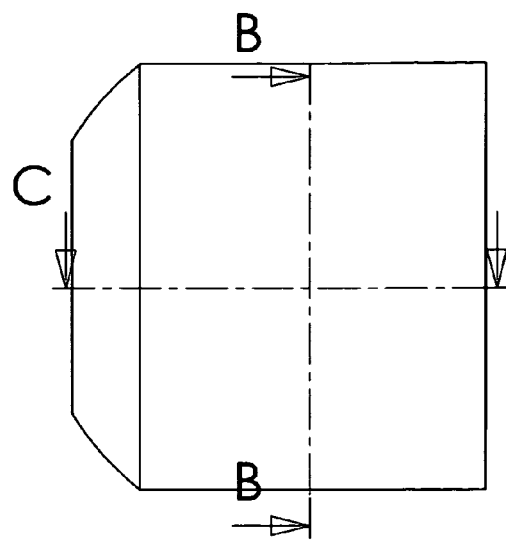
FIG. 11 is a front view of the helical rotary actuator of FIG. 10.
Figure 12:
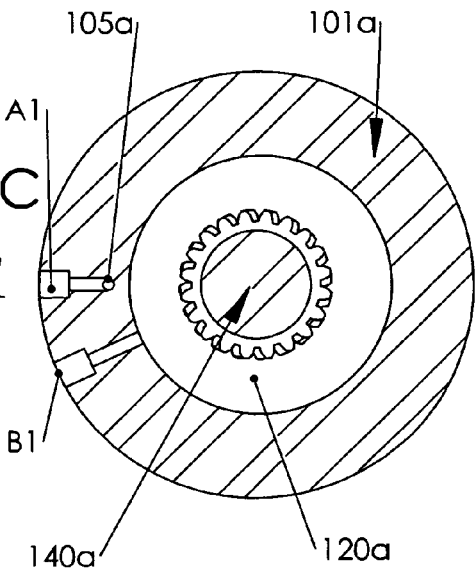
FIG. 12 is a cross sectional view of the helical rotary actuator of FIG. 11.
Along line B-B.
Figure 13:
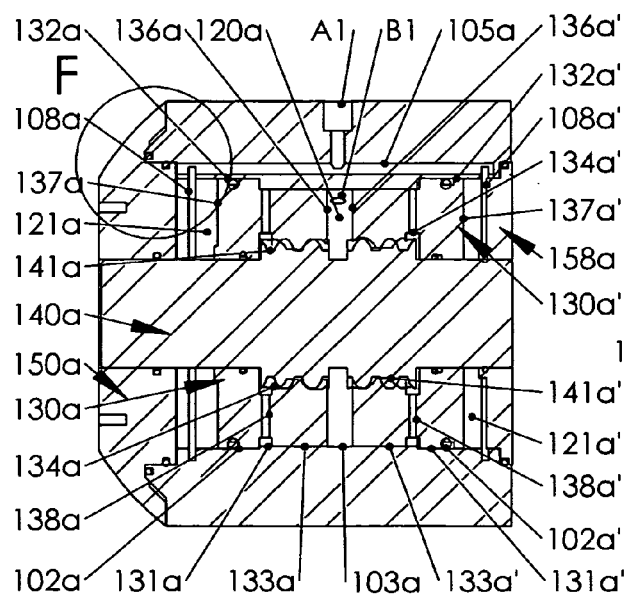
FIG. 13 is a cross sectional view of the helical rotary actuator of FIG. 11.
Along line C-C.
Figure 14:
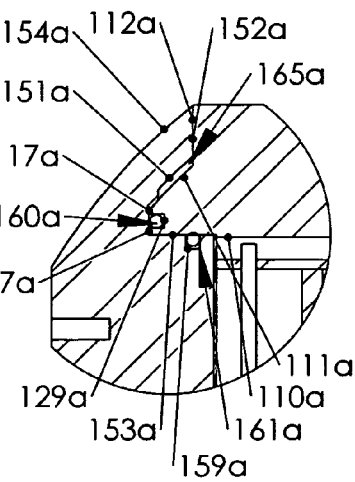
FIG. 14 is a detail view of the helical rotary actuator of FIG. 13.
Along cycle of F.
Figure 15:
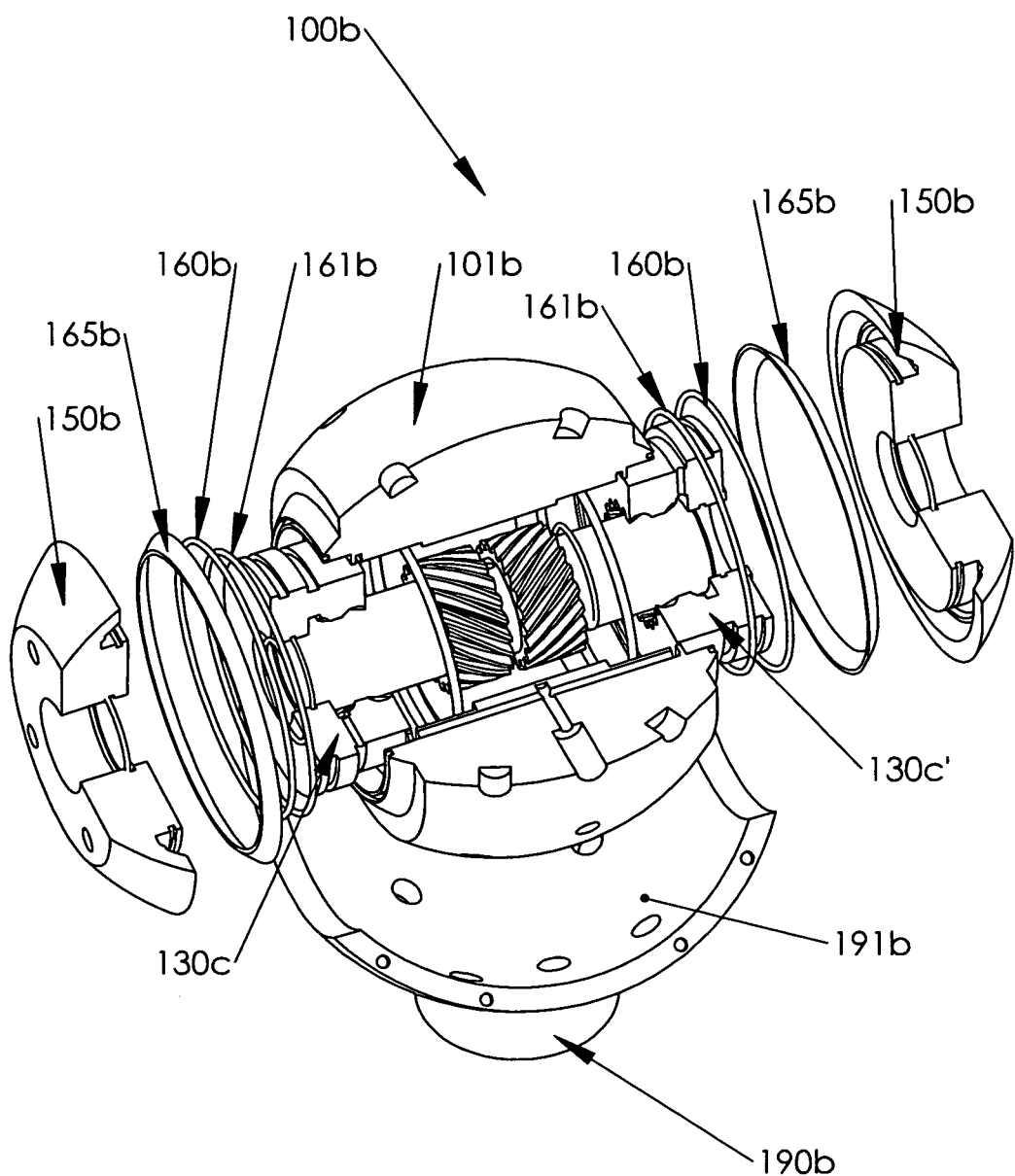
FIG. 15 is an exploded, quarter cut view of an alternative embodiment of helical rotary actuator of FIG. 10.
Figures 20, 21:
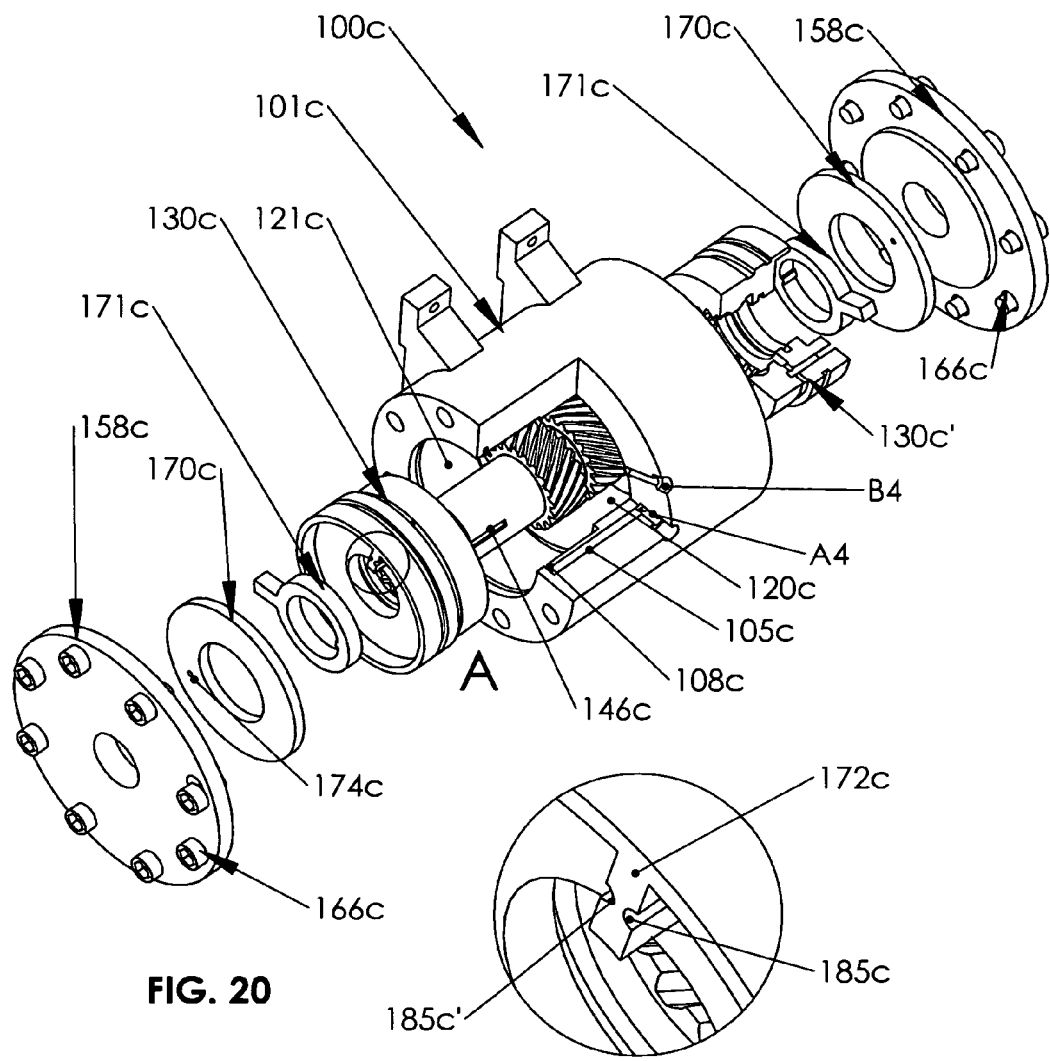
FIG. 20 is an exploded, quarter cut view of an alternative embodiment of helical rotary actuator of FIG. 10.
FIG. 21 is a detail view of the helical rotary actuator of FIG. 20.
along cycle of A
Figures 22, 23:
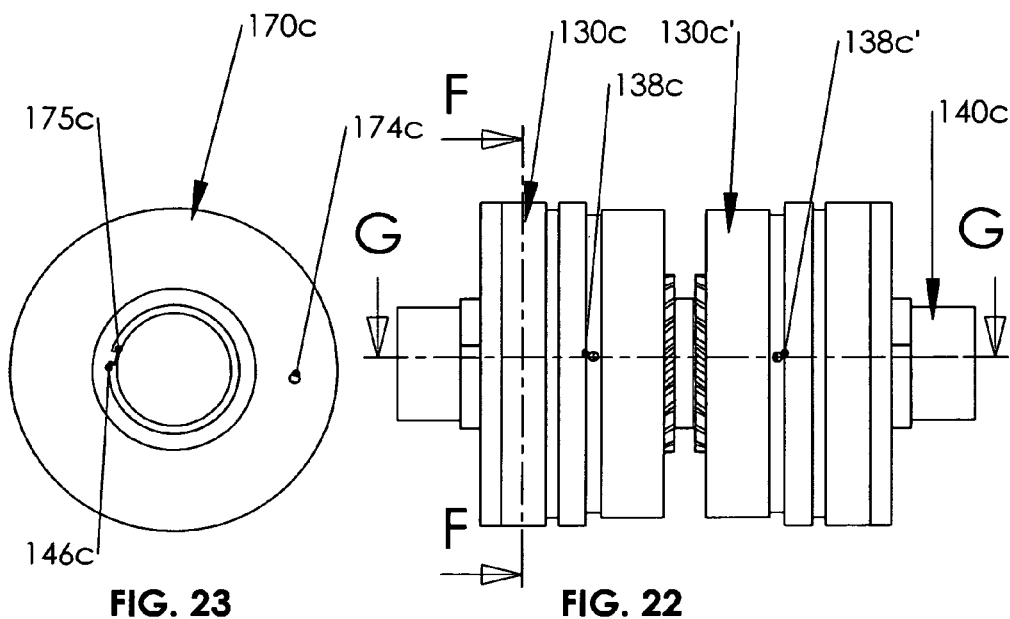
FIG. 22 is a front view of a subassembly of FIG. 20.
FIG. 23 is a side view of the subassembly of FIG. 22.
Figures 24, 25:
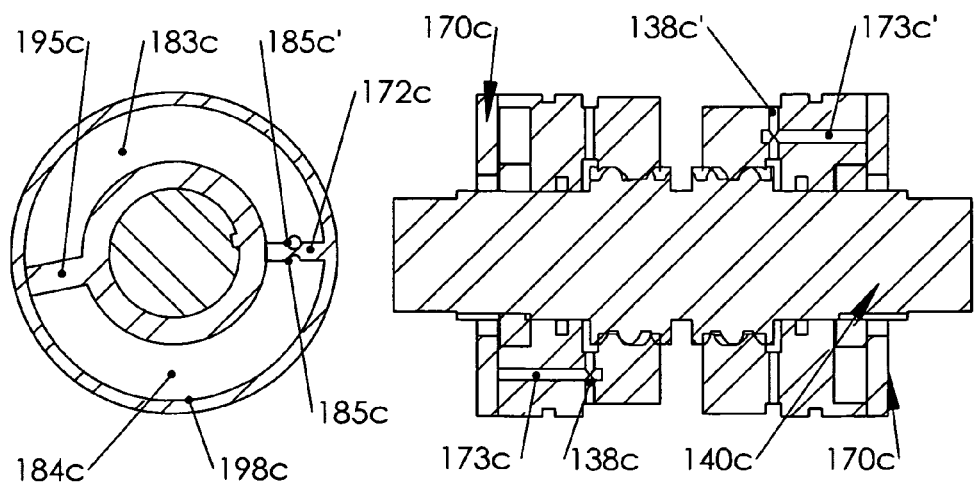
FIG. 24 is a cross sectional view of the subassembly of FIG. 22 along line F-F.
FIG. 25 is a cross sectional view of the subassembly of FIG. 22 along line G-G.
Figure 26:
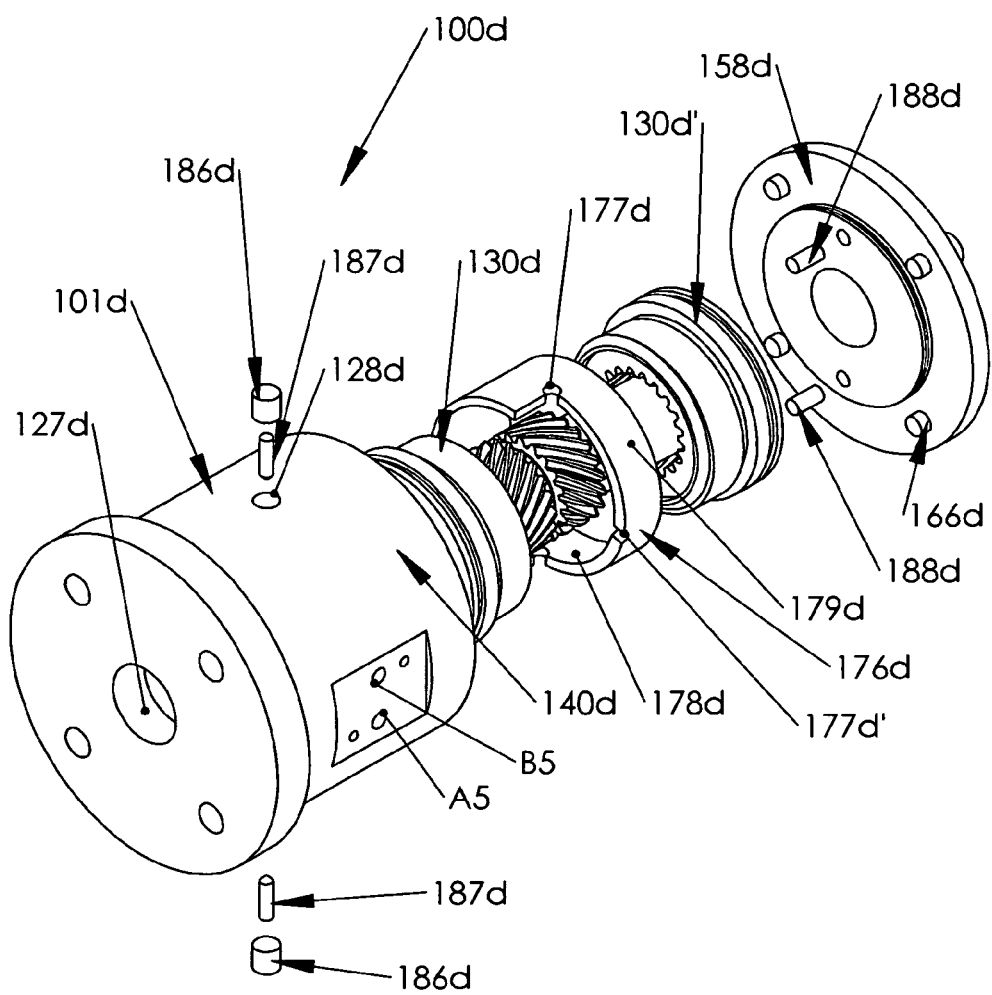
FIG. 26 is an exploded, quarter cut view of an alternative embodiment of helical rotary actuator of FIG. 10.
Figure 30:
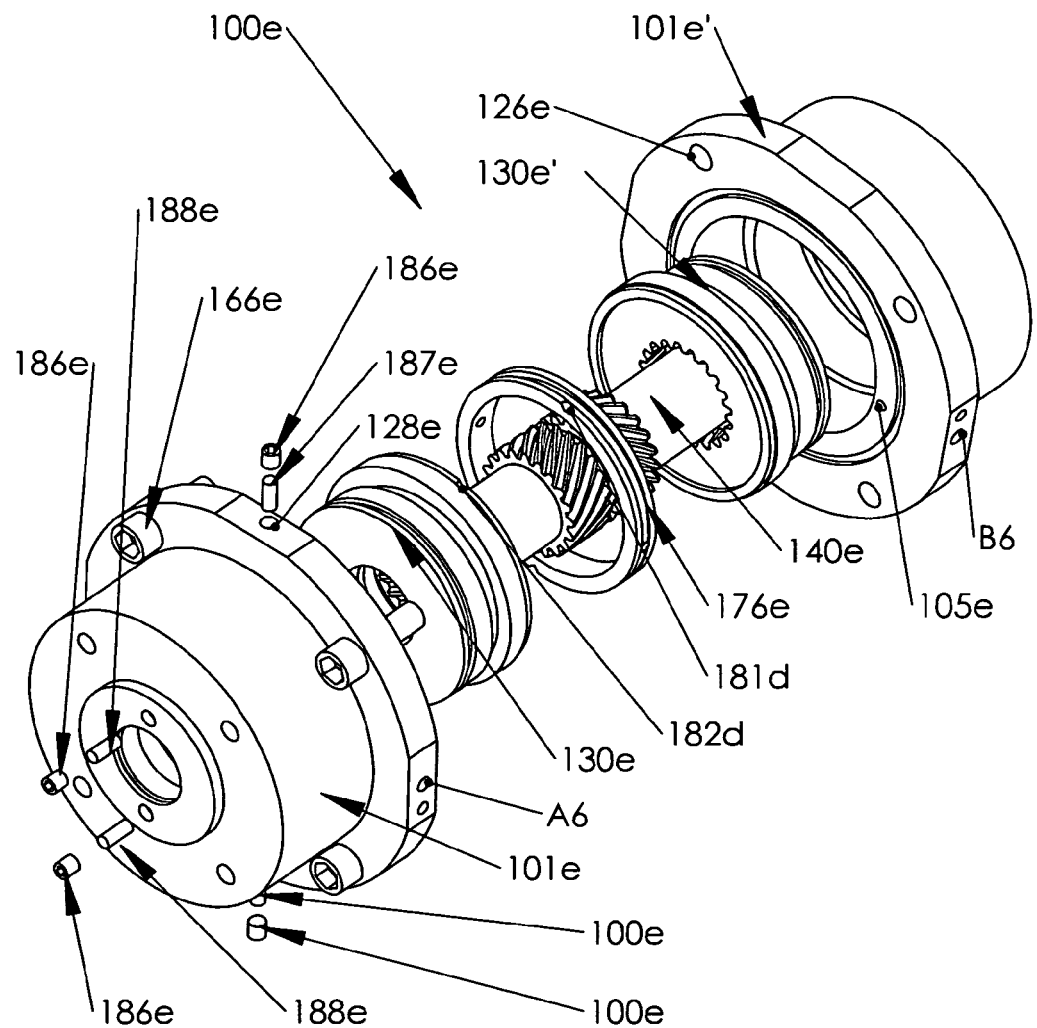
FIG. 30 is an exploded, quarter cut view of an alternative embodiment of helical rotary actuator of FIG. 10.
Figure 31:
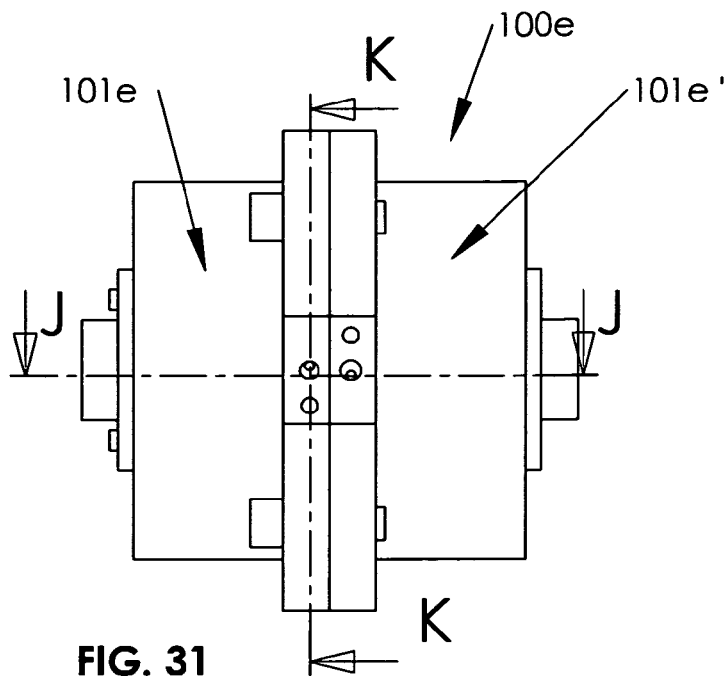
FIG. 31 is a front view of the helical rotary actuator of FIG. 30.
Figures 32, 33:
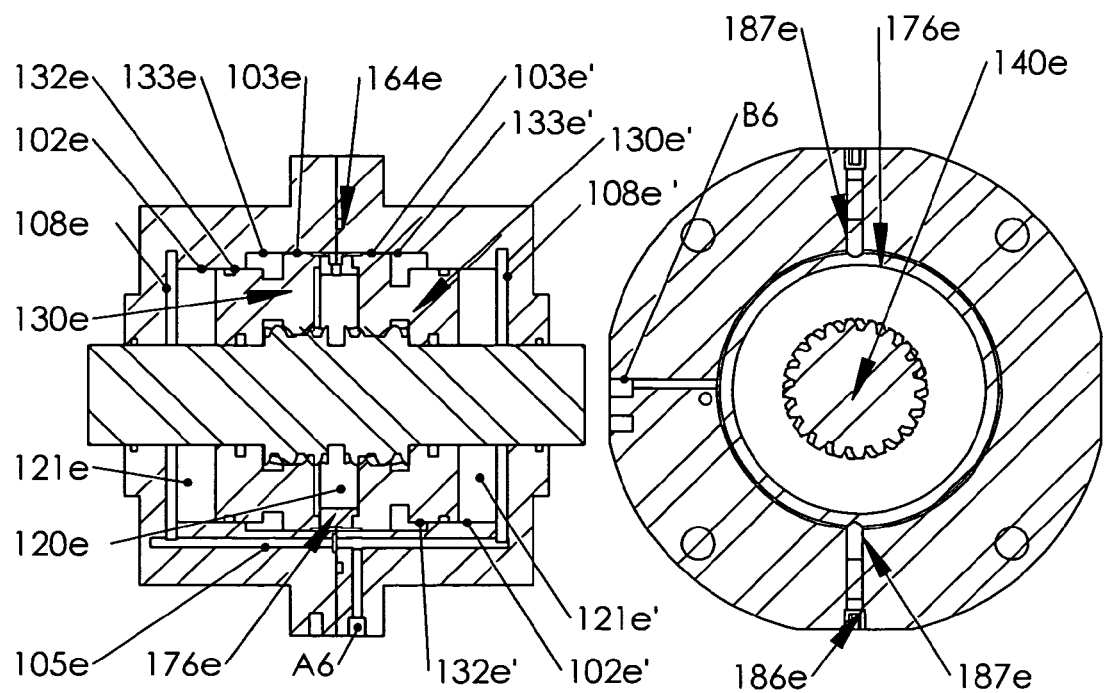
FIG. 32 is a cross sectional view of the helical rotary actuator of FIG. 31 along line K-K.
FIG. 33 is a cross sectional view of the helical rotary actuator of FIG. 30 along line J-J.

Referring to FIG. 9, a helical linear/rotary converting mechanism 20b based on mechanism 20a comprises a body 21b, converting pistons 22b,22b' and a shaft 23b for converting reciprocal movements to rotary movements. Body 21b includes internal left helical teeth 28b and internal right helical teeth 28b' in an opposite direction, converting piston 22b is movably disposed in a left side of body 21b and has a centric bore 26b, an eccentric bore 27b and external helical left teeth 29b engaged with teeth 28b, while converting piston 22b' is movably disposed in a right side of body 21b and has a centric bore 26b', an eccentric bore 27b' and external helical right teeth 29b' engaged with teeth 28b', shaft 23b is movably disposed in pistons 22b,22b' and has eccentric sections 25b,25b' in an opposite direction and a centric section 24b engaged with bore 26b and bore 26b', eccentric section 25b is engaged with bore 27b, while eccentric section 25b' is engaged with bore 27b'.

FIGS. 10-14 illustrate a fluid powered helical rotary actuator 100a based on helical linear/rotary converting mechanism 20a constructed in accordance with the present invention. The actuator 100a comprises a body 101a having an eccentric bore 103a, two centric bores 102a,102a' and pistons 130a,130a', a shaft 140a is movably disposed in pistons 130a,130a', body 101a is covered by a spherical cover 150a and a flat cover 158a and has standard ports A1, B1 which includes port size and distance between port A1, B1 and respectively connected to a pressurized fluid and a sink fluid (not shown), the actuator 100a is provided for rotary movements.

Pistons 130a,130a' are axially opposed and respectively have sections 132a, 133a movably engaged with bores 102a, 103a and sections 132a', 133a' movably engaged with bores 102a', 103a in an opposite direction. Pistons 130a,130a' also include internal helical teeth 134a,134a' in inner surfaces to operatively engage with sections 141a,141a' of the shaft 140a, a center chamber 120a is provided between inward surfaces 136a, 136a' and bore 103a and is connected to port B1 and to grooves 131a,131a' through gaps between teeth 134a and 141a, teeth 134a' and 141a' and link holes 138a, 138a', while side chambers 121a,121a' are defined respectively by cover 150a, an outward surface 137a and bore 102a and by cover 158a, an outward surface 137a' and bore 102a' and connected to port A1 through a passageway 105 and grooves 108a,108a'.

Cover 150a is mounted on a left side of shaft 140a and has a first vertical surface 152a, spherical surface 151a, a second vertical surface 157a and a horizontal surface 153a with an o ring groove 159a, body 101a has a first vertical surface 112a, a spherical surface 111a, a second vertical surface 117a with an o ring groove 129a and horizontal surface 110a, a spherical bearing 165a is placed between surfaces 151a and 111a for providing a bearing and a seal, while o-rings 160a and 161a are respectively placed in groove 129a and groove 159a for providing a vertical seal and a horizontal seal between cover 150a and body 101a.

Referring to FIGS. 15-19, a fluid powered helical rotary actuator 100b based on fluid powered helical rotary actuator 100a comprises a spherical body 101b, pistons 130b,130b', a shaft 140b is movably disposed in pistons 130b,130b', body 101b is covered by two spherical covers 150b, 150b' and has standard ports A2, B2 which includes port size and distance between port A2, B2 and respectively connected to a pressurized fluid and a sink fluid (not shown), there are other optional ports A3, B3 respectively connected to a pressurized fluid and a sink fluid (not shown), the actuator 100b is provided for rotary movements.

A center chamber 120b is connected to port B2 through hole 147b, while side chambers 121b, 124b' are connected to port A2 through holes 148b,148b' and grooves 108b,108b'. Covers 150b,150b' are mounted respectively on a left side and a right side of shaft 140b, a holder 190b has a cylindrical bar extended to shell 191b with a spherical recess 192b to receive actuator 100b for securing a pre-set position, holes 193b and thread holes 125b are provided for bolting between actuator 100b and holder 190b.

Referring to FIG. 20-25, a fluid powered helical rotary actuator 100c based on fluid powered helical rotary actuator 100a comprises a body 101c, pistons 130c,130c', two vanes 171c and two vane covers 170c, a shaft 140c is movably disposed in pistons 130c,130c', vanes 171c and vane covers 170c, body 101c is covered by two covers 158c, 158c' and has standard ports A4, B4 which includes size port and distance between ports A4, B4 respectively connected to a pressurized fluid and a sink fluid (not shown). the actuator 100c is provided for rotary movements.

Pistons 130c,130c' are axially opposed, movably disposed in body 101c since the left piston 130c is as the same as the right piston 130c', only the left side piston is described here, two vane chambers 183c and 184c are defined by piston 130c, vane cover 170c, vane 171c, a vane land 195c of vane 171c and a piston land 172c of piston 130c, a center chamber 120c is connected to vane chamber 183c through gaps between shaft 140c and piston 130c, radial hole 138c and axial hole 173c and a slot 185c', while a side chamber 121c is connected to chamber 184c through hole 174c, slot 185c, vane 171c is coupled with shaft 140c by keyway146c and key 175c.

Referring to FIG. 26-29, a fluid powered helical rotary actuator 100d based on fluid powered helical rotary actuator 20a comprises a body 101d having a left closed end except a shaft hole 127d and a right end with a centric bore 102d to receive a middle ring 176d, pistons 130d,130d', a shaft 140d is movably disposed in pistons 130d,130d' and middle ring 176d, body 101d is covered by cover 158d and has standard ports A5, B5 which includes port size and distance between ports A5 and B5 respectively connected to a pressurized fluid and a sink fluid (not shown), the actuator 100d is provided for rotary movements.

Middle ring 176d is axially placed between pistons 130d, 130d' and has a centric outside surface 179d and an eccentric inside surface 178d. Pistons 130d,130d' have respectively centric sections 132d,132d' engaged with bore 102d and eccentric sections 133d,133d' engaged with eccentric surface 178d. Pistons 130d,130d' also include internal helical teeth 134d,134d' in inner surfaces to operatively engage with external helical teeth 141d,141d' of the shaft 140d. Middle ring 176d also includes three radial holes 177d,177d' and is secured by two screws 187d through holes 177d, conical tips of two screws 187d are engaged with conical surfaces of 182d,182d' for controlling inward positions of pistons 103d, 103d', two screws 188d are threaded through cover 158d for controlling outward positions of piston of 130d, hole 176d' is linked between port B5 and inside surface 178d.

Referring to FIG. 30-33, a fluid powered helical rotary actuator 100e based on fluid powered helical rotary actuator 100a comprises a pair of split bodies 101e,101e' to receive a middle ring 176e and pistons 130e,130e', bodies 101e, 101e' respectively have centric bores 102e,102e' and eccentric bores 103e,103e', pistons 130e,130e' are axially opposed and respectively have sections 132e,133e engaged with bores 102e,103e and sections 132e',133e' engaged with bores 102e', 103e', a shaft 140e is movably disposed in pistons 130e,130e' and middle ring 176e, split bodies 101e, 101e' are secured by four of bolts 166e and sealed by o-ring 164e, bodies 101e,101e' have standard ports A6, B6 which includes size port and distance between port A6, B6 respectively connected to a pressurized fluid and a sink fluid (not shown), the actuator 100e is provided for rotary movements.

Pistons 130e,130e' are axially opposed, movably disposed in bodies 101e,101e', a center chamber 120e is connected to port B6, while side chamber 121e,121e' are connected to port A6 through a passageway 105e and grooves 108e,108e', body 101e has two holes 128e, two screws 187e are respectively threaded through holes 128e and engaged with conical surfaces 181e,181e' defined by ring 176e and piston 130e for controlling an inward position of pistons of 130e,130e', screws 188e are threaded through cover 158e for controlling outward positions of piston 130e and are secured by plugs 186e.

Figure 34:
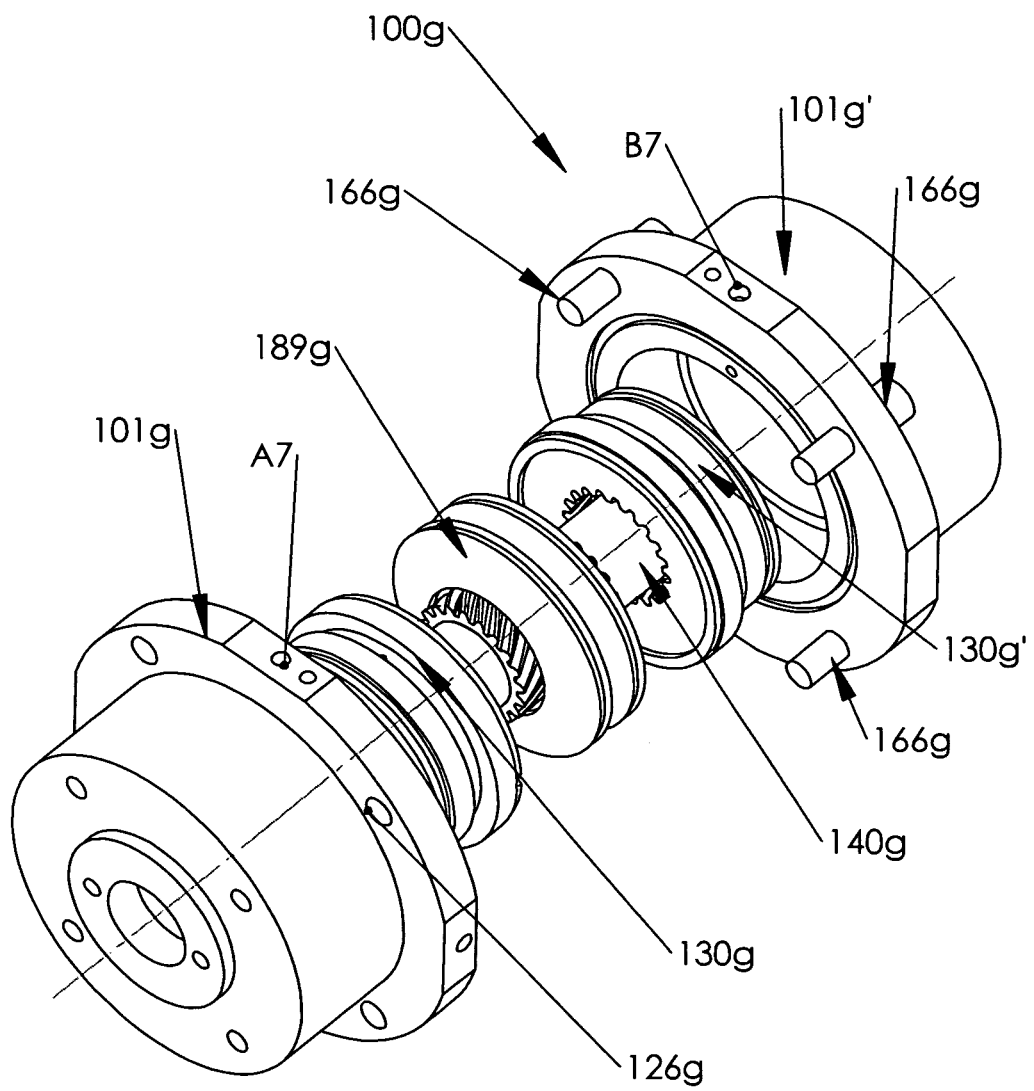
FIG. 34 is an exploded view of an alternative embodiment of helical rotary actuator of FIG. 30.
Figure 35:
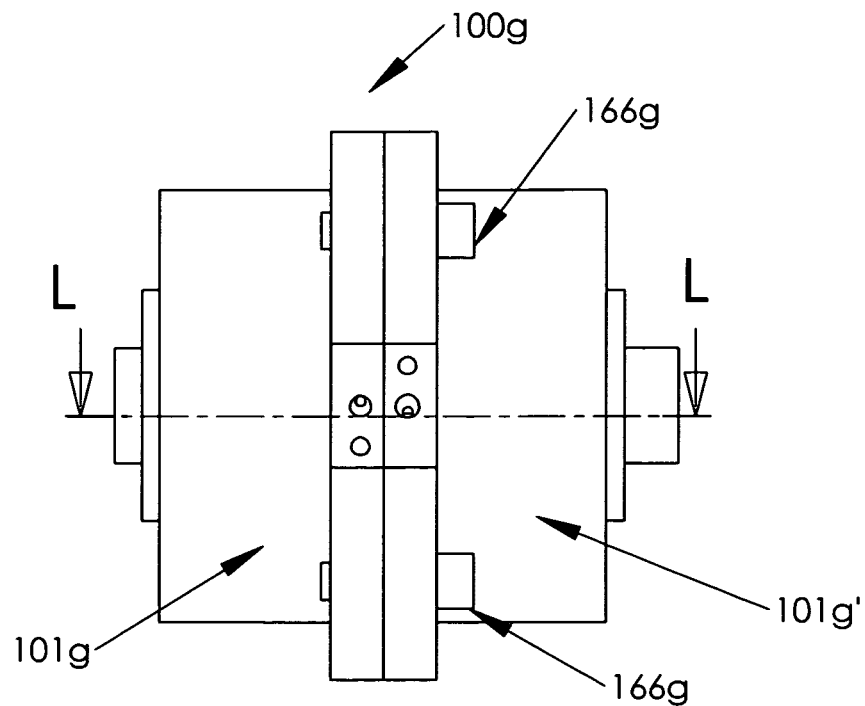
FIG. 35 is a front view of the helical rotary actuator of FIG. 34.
Figure 36:
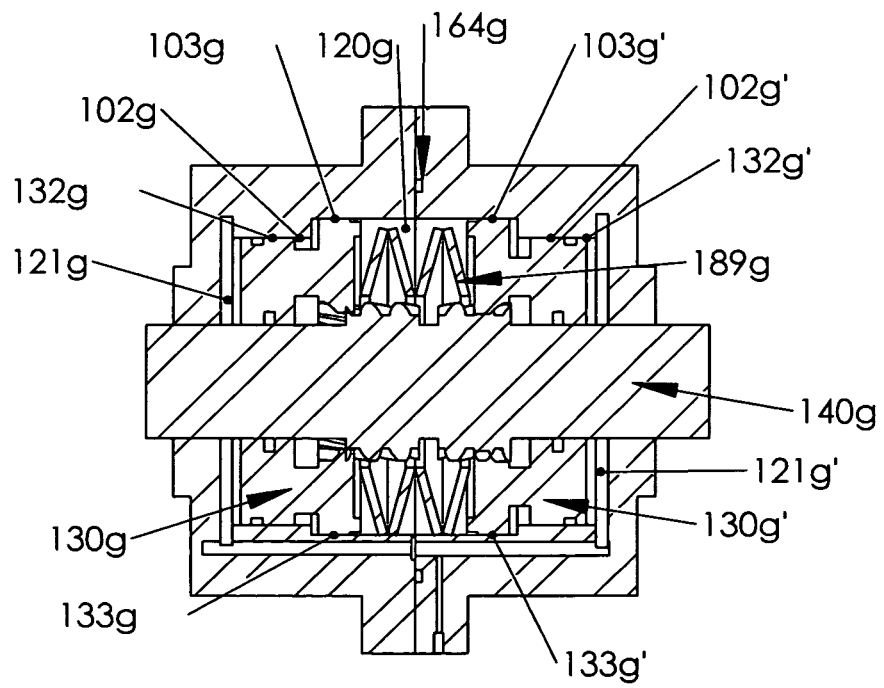
FIG. 36 is a cross sectional view of the helical rotary actuator of FIG. 35 along line L-L.

Referring to FIG. 34-36, a fluid powered helical rotary actuator 100g based on fluid powered helical rotary actuator 100e comprises a pair of split bodies 101g,101g', spring set 189g, pistons 130g,130g', a shaft 140g is movably disposed in pistons 130g,130g' and a spring set 189g, split bodies 101g,101g' are secured by four of bolts 166g and sealed by o-ring 164g, the pair of split bodies 101g,101g' has standard ports A7, B7 which includes size of port and distance between ports A7,B7 respectively connected to a pressurized fluid and a sink fluid (not shown), the actuator 100g is provided for rotary movements.

Bodies 101g,101g' respectively have centric bores 102g, 102g' and eccentric bores 103g,103g', pistons 130g,130g' are axially opposed and have respectively sections 132g,133g and sections 132g',133g' engaged with bores 102g, 103g and bores 102g' and 103g', the spring set 189g is placed between pistons 130g and 130g' for spring return.

Figure 5:
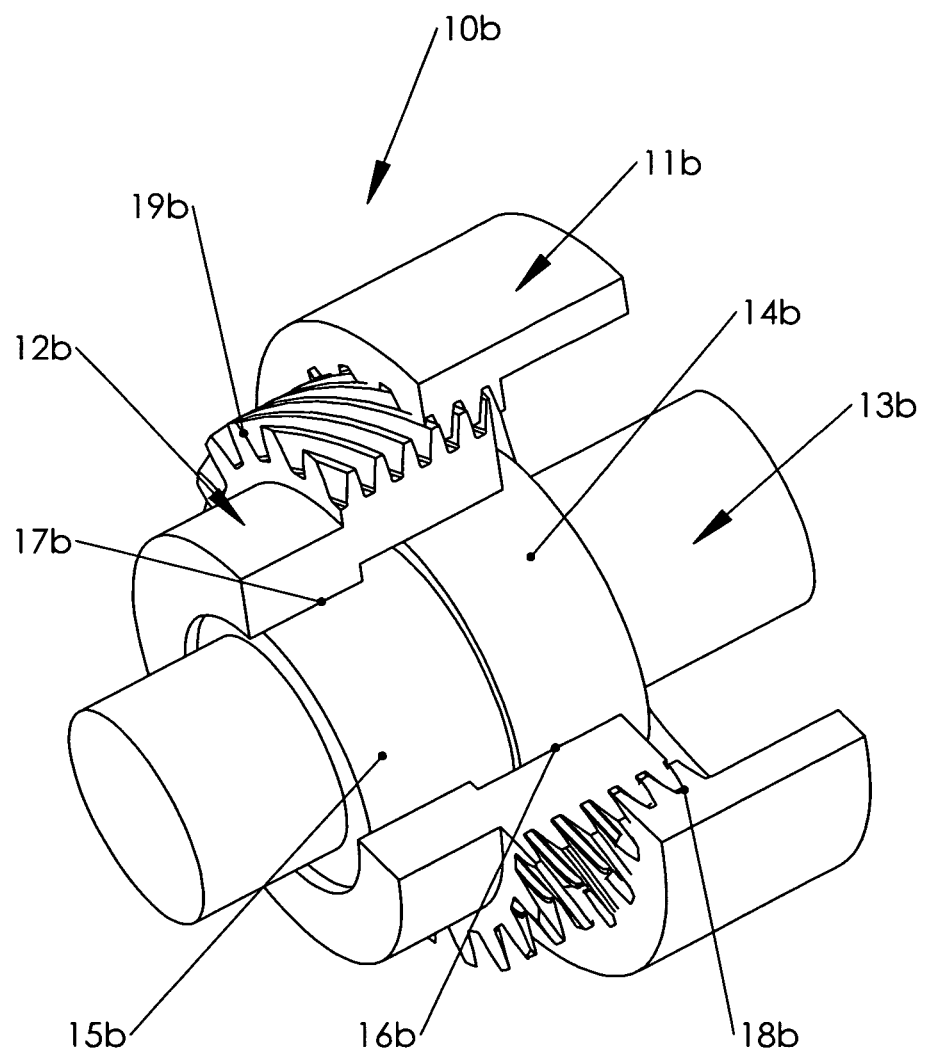
FIG. 5 is an exploded, quarter cut view of an alternative embodiment of helical linear/rotary converting mechanism of FIG. 1.
Figure 37:
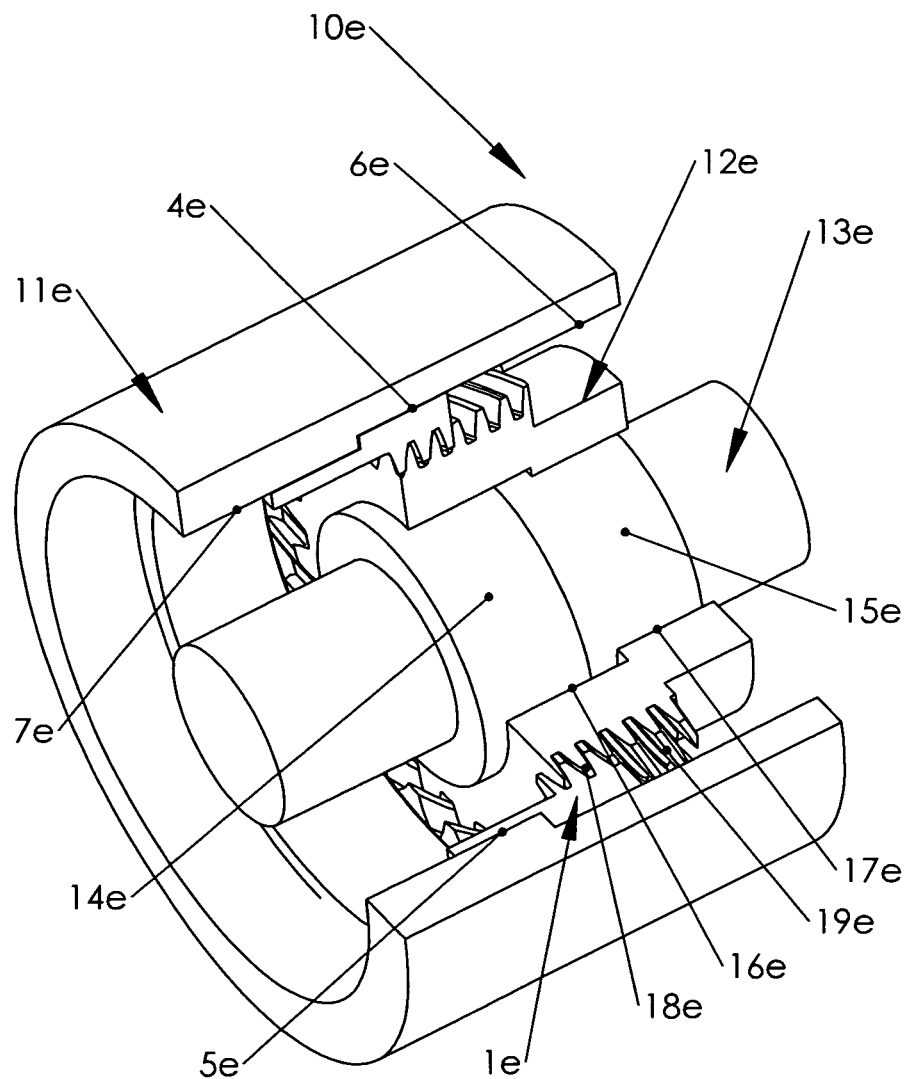
FIG. 37 is an exploded, quarter cut view of an alternative embodiment of helical linear/rotary converting mechanism of FIG. 5.

Referring to FIG. 37, a helical linear/rotary converting mechanism 10e based on 10b of FIG. 5 comprises a body 11e, a support ring 1e, a converting piston 12e and a shaft 13e for converting linear movements to rotary movements. Body 11e has a centric bore 6e and an eccentric bore 7e, support ring 1e has a section 4e engaged with bore 6e and an eccentric section 5e engaged with bore 7e and internal helical teeth 18e.

Figure 38:
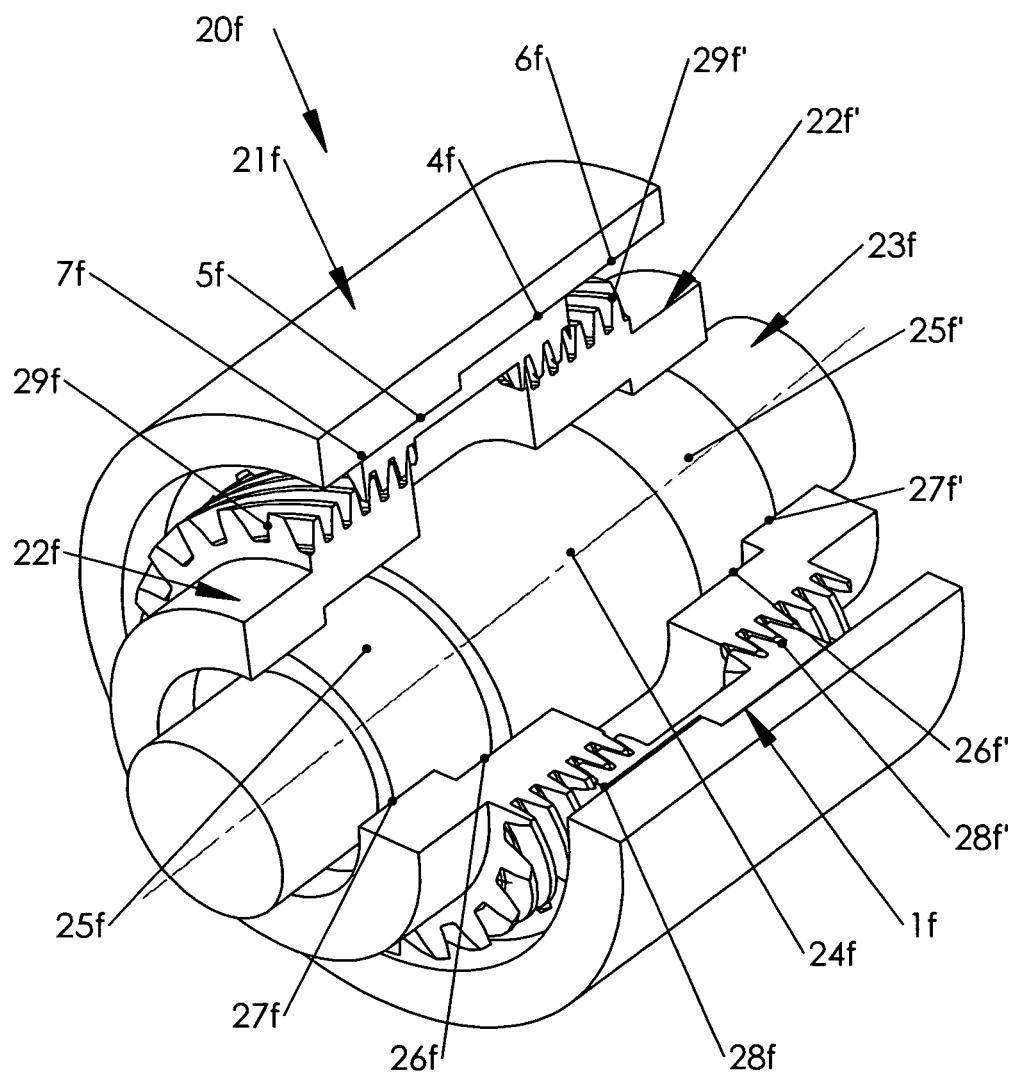
FIG. 38 is an exploded view of an alternative embodiment of helical linear/rotary converting mechanism of FIG. 9.

Referring to FIG. 38, a helical linear/rotary converting mechanism 20f based on 20b of FIG. 9 comprises a body 21f, a support ring 1f, converting pistons 22f,22f' and a shaft 23f for converting linear movements to rotary movements. Body 21f has a centric bore 6f and an eccentric bore 7f, support ring 1f has a section 4f engaged with bore 6f and an eccentric section 5f engaged with bore 7f and helical teeth 28f, 28f'.

Figure 39:
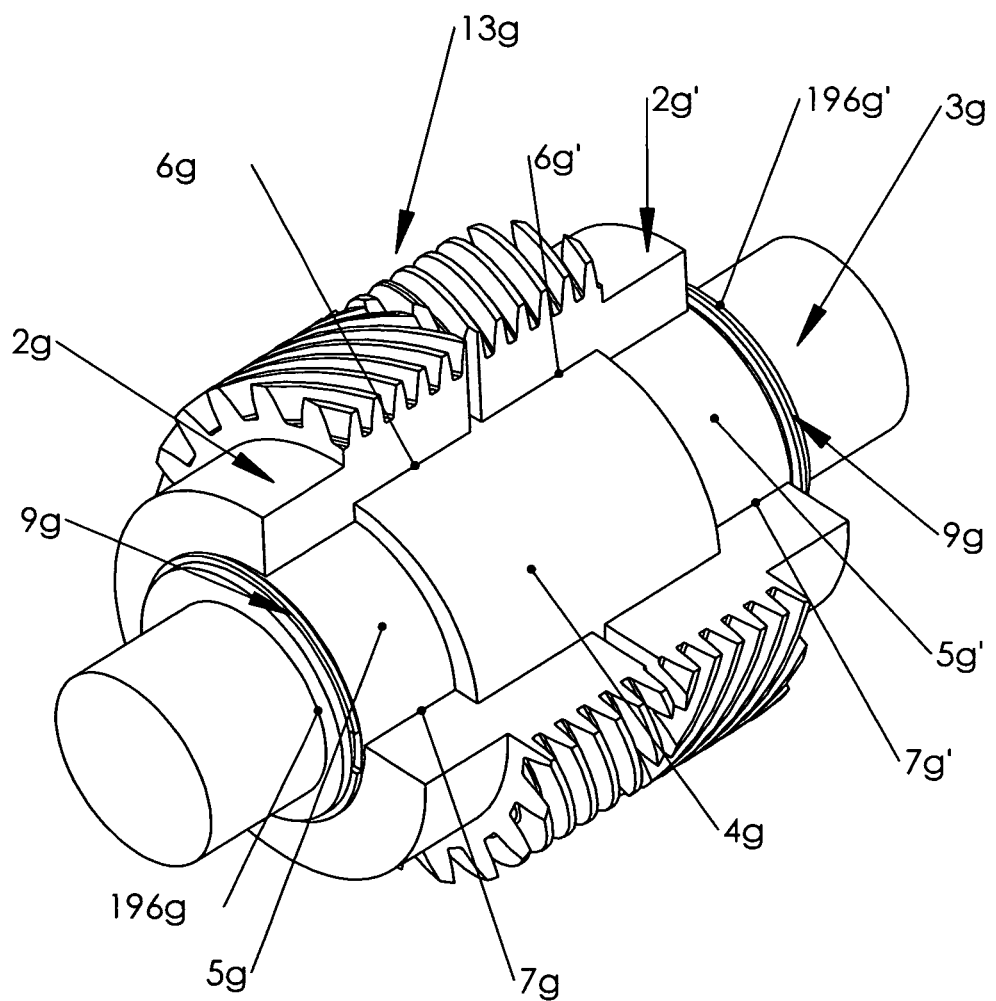
FIG. 39 is an exploded, quarter cut view of an alternative embodiment of shaft of FIG. 8.

Referring to FIG. 39, a shaft assembly 13g based on 20a of FIG. 8 comprises a pair of teeth rings 2g,2g' two retaining rings 9g and a shaft 3g, shaft 3g has a left centric sections 5g with a left groove 196g and a right centric section 5g' with a right groove 196g' and an eccentric section 4g, teeth rings 2g,2g' have bores 6g and 6g' movably engaged with sections 4g and bores 7g,7g' movably engaged with section 5g,5g', teeth rings 2g,2g' placed on both ends of shaft 3g are secured by two retaining rings 9g respectively disposed in grooves 196a,196a'.

Figure 40:
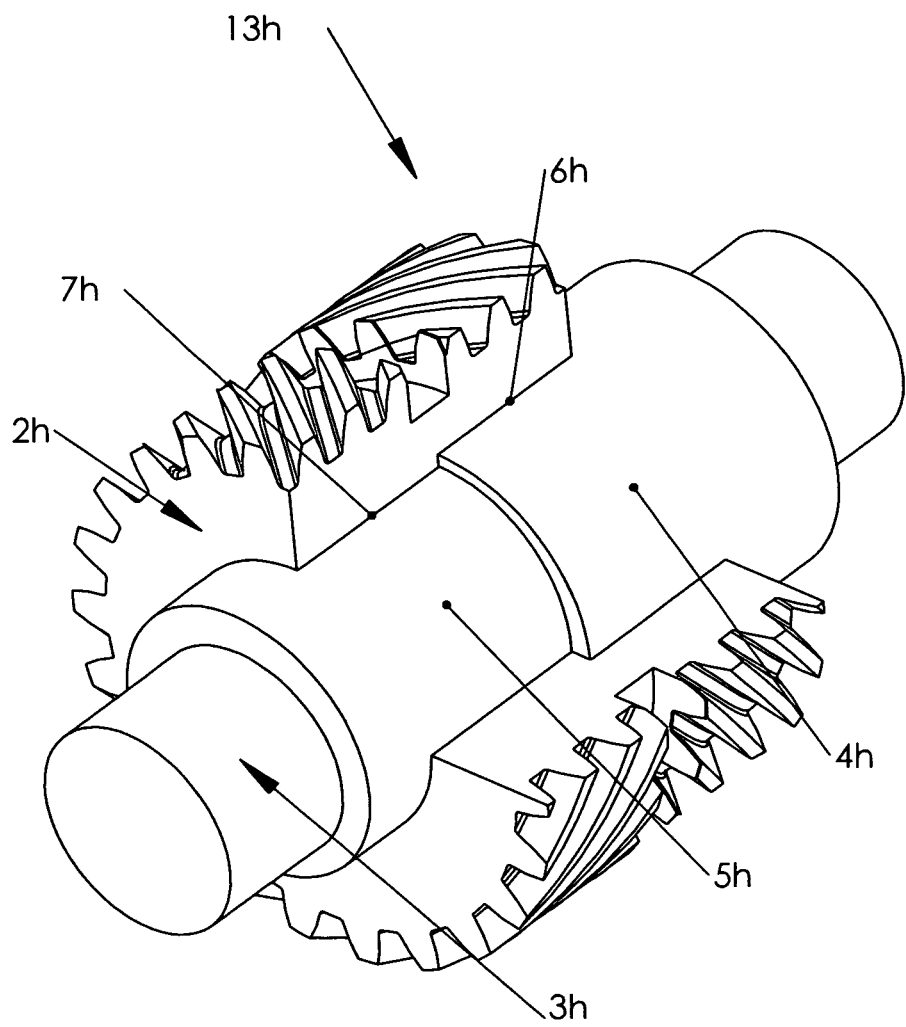
FIG. 40 is an exploded, quarter cut view of an alternative embodiment shaft of FIG. 9.

Referring to FIG. 40, a shaft assembly 13h based on 20a of FIG. 8 comprises a shaft 3h and a teeth ring 2h, shaft 3h has an eccentric section 5h and an centric section 4h, teeth ring 2h has a centric bore 6h engaged with sections 4h and an eccentric bores 7h engaged with section 5h.

Operations

For the mechanisms 10a, assume that piston 12a is inserted into body 11a by engaging between sections 14a, 15a, and bores 16a,17a with a clearance fit, then shaft 13a is inserted into piston 12a by engaging between helical teeth 19a and helical teeth 18s with a clearance fit, piston 12a tends to rotate under axial force, but since there is an offset between bores 16a,17, the offset only allows piston 12a to move linearly but prevents piston 12a from rotation, as a result, the helical teeth 18a on piston 12a forces helical teeth 19a as well as the shaft 13a to rotate, in case of mechanisms 10c, 10d, only difference is the helical converting means.

For the mechanisms 10b, assume that piston 12b is inserted into body 11b by engaging between helical teeth 19b and helical teeth 18b with a clearance fit then shaft 13b is inserted into piston 12b by engaging between sections 14b,15b, and bores 16b,17b with a clearance fit, piston 12b rotates under axial forces, since there is an offset between bores 16b, 17b, as a result, the offset force shaft 130b to rotate along with the piston 12b.

For mechanisms 20a, assume that shaft 23a is inserted into body 21a, then piston 22a is inserted into ring 21a from the left side by engaging between sections 24a, 25a, and bores 26a,27a with a clearance fit and between helical left teeth 29a and left helical teeth 28a, then piston 22a' is inserted into body 21a from the right side by engaging between sections 24a', 25a' and bores 26a',27a with a clearance fit and between right helical teeth 29a' and right helical teeth 28a', two equal but opposite forces are applied inwardly and outwardly to piston 22a and 22a', piston 22a tends to rotate under axial forces, but since there is an offset between bores 26a,27a, the offset only allow piston 22a to move linearly but prevents piston 22a from rotation, as a result, the helical teeth 28a on piston 22a forces helical teeth 29a as well as the shaft 23a to rotate clockwise, while piston 22a' tends to rotate under axial forces, but since there is an offset between bores 26a',27a', the offset allows piston 22a' to move linearly but prevents piston 22a' from rotation, as a result, the helical teeth 28a' on piston 22a' forces helical teeth 29a' as well as shaft 23a rotate the clockwise due to opposite direction between teethes of 29a,28a and 29a',28a', so the axial forces balances on shaft 23a.

For the mechanisms 20b, the balance mechanism is the same as the mechanism 20a, while the operation is the same as mechanism 10b For actuator 100a, assume that shaft 140a is inserted into body 101a, then piston 130 a is inserted into body 101a from the left side by engaging between sections 132a,133a, and bores 102a,103a with a clearance fit and between helical teeth 134a and helical teeth 141a, then piston 130a' is inserted into body 101a from the right side by engaging between sections 132a',133a' and bores 102a',103a with a clearance fit and between helical teeth 134a' and helical teeth 141a'.

Port A1 and port B1 are respectively connected to a pressurized fluid source/a fluid sink (not shown), there is no movement of the piston 130a,130a' or that of shaft 140a. When a pressurized flow fluid is allowed to enter to chamber 121a,121a' through port A1, then spilt into two flows into passageways 105a, then into grooves 108a,108a', the flow fluids provide sufficient pressure against pistons 130a, 103a' from outward surfaces 137a,137a', while fluids in chambers 120a through B1 connected to the fluid sink have a lower pressure, so pressure differentials generate two equal but opposite forces against pistons 130a,130a' inwardly and cause inward movements of two pistons 130a,130a' in a synchronized manner, so shaft 140a is balanced in the axial direction, because of offset engagement between body 101a and piston 130a,130a', piston 130a,130a' are only allowed to move linearly, as a result, the helical teeth 134a on piston 130a and teeth 134a' in piston 130a' force helical teeth 141a, 141a' as well as the shaft 140a to rotate clockwise. On the contrary, when the connections of ports A1 and port B1 with the fluid source/the fluid sink are switched, the conditions of flow fluids are reversed, shaft 140a is rotated anti-clockwise.

For the actuator 100a installed in between vertical and horizontal positions, the gravity force or an external axial force is applied to cover 150a and shaft 140a, in turn cover 150a will distribute the load into bearing 165a and body 101a evenly due to the spherical surface engagement, then shaft 140a distribute the torsion evenly to two pistons 130a,130a' due to the balanced arrangement of pistons 1301a,130a'.

For actuator 100b, it can be used as a combination of a hinge and an actuator, actuator 100b can installed in any position and sustain great bending as well as axial force due to spherical shape of body and cover which can cancel out most of non axial force, it also can be easily used for connecting other dimensional rotary device.

For actuator 100c, when a backlash is not allowed, actuator 100c can be used, by nature a vane actuator has no backlash, actuator 100c based on 100a can be modified by adding two the same vane actuators on both ends of pistons 130c,103c'. Ports A4,B4 are respectively connected to a pressurized fluid source/a fluid sink (not shown), there is no movement of the pistons 130c,130c', or that of shaft 140c. When a pressurized flow fluid is allowed to enter to chamber 121c,121c' through port A4, then spilt into two flows into passageways 105c, then through hole 174c, slot 185c into vane chamber 184c, the flow fluids provide sufficient pressure against land 195c which is keyed with shaft 140c by key 175c and keyway 146c, while low pressure fluids in vane chambers 183c enters chamber 120c through holes 173c, 138c and engagement gaps between shaft 140c and piston 130c, in turn, chamber 120c is connected to the fluid sink, so pressure differentials forces lands 195c as well as shaft 140c to rotate clockwise. On the contrary, when the connections of ports A4 and port B4 with the fluid source/the fluid sink are switched, the conditions of flow fluids are reversed, shaft 140c is rotated anti-clockwise.

For actuator 100d which can be used when precision rotary position is required, piston 130d,130d are placed in center of body 101d, two screws 187d are threaded in holes 128d,177d with conical tips engaged with both conical surfaces 182d,182d', by rotating the screw 182d,182d', inward movement of pistons 130d,130d' are controlled to a preset position, on the outward sides, two flat tip screws 188d are threaded through cover 158d, by rotating the screw 188d,188d', outward movement of pistons 130d,130d' are controlled for a pre-set position of shaft 140d.

For actuator 100e, assume that ring 176e is pressed into piston 130e, then two pistons 130e,130e' are placed from both ends of shaft 140e, then two bodies 101e,101e' are placed from both ends of shaft 140e by aligning up between hole 128e, conical surfaces 181d,182d and secured by bolts 166e. Port A6 and port B6 are respectively connected to a pressurized fluid source/a fluid sink (not shown), there is no movement of the piston 130e,130e' or that of shaft 140e. When a pressurized flow fluid is allowed to enter to chamber 121e,121e' through port A6, then spilt into two flows into passageways 105e, then into grooves 108e,108e', the flow fluids provide sufficient pressure against pistons 130e, 130e', while fluids in chambers 120e through port B6 connected to the fluid sink have a lower pressure, so pressure differentials move pistons 130e,130e' inwardly in a synchronized manner then make shaft 140e to rotate clockwise. On the contrary, when the connections of ports A6 and port B6 with the fluid source/the fluid sink are switched, the conditions of flow fluids are reversed, shaft 140e is rotated anti-clockwise.

For actuator 100g which can be used for single acting application, top and bottom is interchangeable for fail closed and fail open of valve control without changing any part, assume that one set of springs 189g is placed into shaft 140g, then two pistons 130g,130g' are placed from both ends of shaft 140g, then two bodies 101g,101g' are placed from both ends of shaft 140g and secured by bolts 166g. Port A7 and port B7 are respectively connected to a pressurized fluid source/a fluid sink (not shown), there is no movement of the piston 130g,130g' or that of shaft 140e. When a pressurized flow fluid is allowed to enter to chamber 121g,121g' through port A7, then split into two flows into passageways 105g, then into grooves 108g,108g', the flow fluids provide sufficient pressure against pistons 130g,130g', while fluids in chambers 120g through port B7 connected to the fluid sink have a lower pressure, so pressure differentials move pistons 130g,130g' inwardly in a synchronized manner then make shaft 140g to rotate clockwise and compress springs 189g. On the contrary, when the connections of ports A7 loses pressure, the pressure differentials disappears, the compressed springs force pistons 130g,130g' to move outward and make shaft 140g rotated anti-clockwise.

Advantages

From the description above, a number of advantage of some embodiments of my helical rotary actuator become evident:
(1) high efficiency, with double effective areas of pistons, balance design, this embodiment increase the efficiency of helical rotary actuator from about 60%-70% to 85-95, with less materials and weights, smaller size, it opens the door to the low pressure pneumatic actuators market against rack and pinion and vane actuators
(2) a balanced thrust, the thrust is fully balanced on the shaft without any bearing under both inward and outward pressures, so under no time, the piston bears any external axial load, both the body and shaft take external side or axial loads evenly, so the piston can generates more torque than any helical actuator and last longer, the other benefit is vibration proof, due to left and right pistons work in an opposite direction, any axial movement will not change rotation position of shaft as long as there is no the relative position change between the left and right positions.
(3) no backlashes, first the dual center engagement does not add any axial clearance, second the left helical teeth and right helical teeth works against each other and cancel out any clearance in the axial direction, finally the piston with the vane actuator completely eliminate any backlashes structurally
(4) No high stress concentration on the body, with the dual center engagement, the body no longer has high stress concentration on the wall without the teeth or shape spline, it greatly reduce the wall thickness of the body and increase safety of the body and meet the pressure vessel standards for critical applications
(5) free installation position, with spherical joint between body and cover, balanced thrust, the invention provides an actuator which can be installed between any position between vertical and horizontal positions.
(6) precision position control, with conical and flat surfaces engagements devices, both inward and outward positions are fully controlled, now this actuator can be used for a critical applications such as military equipment, robotic devices and valve control
(7) versatile interface functions, most of the actuator bodies are cylindrical shape, such a shape is difficult for three dimensional joint
(8) high reliability, without high stress concentration on the body, high tension on the piston and balanced thrust on the shaft, this actuator has highest safety design over all existing helical rotary actuators, in addition, the dual independent pistons, porting systems provide redundant functions, if a left piston fails, the right piston still functions independently, it can be used for airplane landing gears or linear piston with pivot joint in the construction machines or lift equipment.
(9) optimized structural design (a) spherical body can sustain high structural bending and compression loads, it can be used for stand-along or combine with additional actuator for 2 D or 3 D position control (b) material comparability with design, now material for body can be different from that of teeth rings for design or application purpose, so teeth ring can be heat treated or hardened, while body can be ductile with anti wearing coating in ID wearing resistance, so it sustains high pressure on body and high compression and wearing on ID surface and does not scarify any design requirement and greatly increase the life of the product.
(10) Easy and low cost manufacturing, the dual-center mechanism with two pair of simple cyclical bore/sections engagements greatly reduce manufacturing and assembly cost and time at least by 50%, an axial distance adjustment becomes much easy, most of all, helical teeth ring can be replaced without replacing the body or shaft, with middle ring with eccentric surfaces, even the offset machining becomes simpler, moreover, teeth ring can be pre-made, only left is ID or OD,
(11) Standard input and out port, the novel internal port system makes standardized the port size and distance between inlet port and outlet port possible, it reduces adaptor and tube, but also increases the reliability of the connection, the ports can be directly connected with counterbalanced valve, two way to four way solenoid valve without tube or adaptors.

CONCLUSION, RAMIFICATIONS AND SCOPE

The dual-center engagement mechanism in helical rotary actuator completely changes the rotary/linear converting concept and provides breakthrough performances and advantages over all existing rotary actuators (1) simplicity, two simple cylindrical engagement with an offset, but magically much better than the conventional helical actuators either have complicated dual internal and external helical teeth on piston or external spline and internal helical on the piston, more effective areas for axial forces than that of conventional helical actuators, the double center engagement can be arranged as example of mechanism 20a, A left offset+A center+A right offset, so the left offset can be balanced the right left offset within the body under axial forces, or A centric+An offset+A centric, such a arrangement can reduce machining, or simple a centric bore with middle ring with a centric OD and an eccentric ID like mechanism 100d (2) robust, there is no detrimental features on the body, two cylindrical engagement convert the torsion from the piston to compression, such a compression structure greatly increase the body ability for holding the torque than any other methods on the conventional helical actuators while no space waste for keyway or helical or spline teeth or seals, in case of high cycle operation, there is no one location standing high impact force on the body unlike the conventional helical actuator, the impact force can enlarged the small fraction on teeth on the body and cause body buster. (3) compact, since there is no external helical teeth, the internal teeth diameter on piston can be made bigger with the size of the conventional helical piston, since there is no keyway or spline teeth, the seal groove can be on any place on the piston, it reduce at 50% length of the conventional helical actuator requires. (4) synergy, without the dual-center engagement mechanism, no full thrust balance can succeed, as the readers look back the history of helical actuator, as it evolves, no truly balance structure has been succeed, the reason is that the conventional helical actuator without an axial balance mechanism is already too longer at least twice as longer than that of the dual-center engagement mechanism actuator, if other half is added, it will be at four time longer than the dual-center engagement mechanism actuator, it is away beyond design scope in term of strength, stability and concentricity, and it is difficult to make, with dual-center engagement mechanism, fully balance helical actuator is about the same as the conventional one piston helical actuator Each of embodiments of the present invention provides each advantage, each unique solution and each special modular structure to solve each problem existing for very long time, there are three interface elements, body where to hold, shaft where to rotate, fluid port where to get energy for operation, with all existing problem in mind (1) mechanism 100a is used as a hinge with rotary actuator in many lift equipment and deal with installation issue between vertical and horizontal positions, it provide a novel sandwich three seals, vertical o ring and horizontal o ring and conical or spherical bearing, which made out soft metals like bronze, or engineering plastics like peek to provide a seal between the cover and the body and, a bearing function to shift the load from the cover and shaft to the body to the body, the triple seals secure a sound sealing function in any rotation position between vertical and horizontal positions, when it is installed in vertical position, or a horizontal position or between the vertical seal or horizontal seal with no or a bit effect of gravity for seal due to spherical or conical engagement between the cover and body, while spherical bearing play a key to swift gravity load to the body as well for hard seal (2) mechanism 100b dealt with adaptability issue, it is used for providing 360 degree rotation, it is breakthrough in term of usage, it can sustain very high compression load or bending load, three of them combine can provide any third dimension position due to the spherical joint between cover and body, it can be used as robotic arm joint to replace linear piston with a pivot joint device or artificial arm or leg joint with a linear piston arm or leg, it can be used as a self motored hydraulic wheel for at 360 degree rotation (3) mechanism 100c dealt with backlash issue, the backlash causes loss of control of position, damage of output shaft or other piston or body and weakens joint between actuator and other connected part and is a nightmare for control engineers, with a conventional helical actuator, it is impossible to eliminate the backlash, or loss motion, because two sets of clearance between the body and piston, piston and shaft are caused by one piece of the piston, but with this embodiment, the two teeth engagements are separated by two pistons, there is no cumulative clearance, moreover actuator 100c solves the problem by adding two vane actuator on both sides, by nature, vane actuator has no backlash, the helical actuator provide a converting, rigid torque, the torque is not susceptible to an inlet pressure frustrations, while the vane actuator provides a soft direct torque without converting or delay, when the actuator start to rotate the shaft, a combination soft and rigid torques provides a smooth, backlash free rotation movement, by changing size of hole 174c vane torque can be either reduced or increased, moreover the vane actuator can be used as a damper when actuator acts too fast, this combination of vane actuation and two pistons arrangement solution surpass all previous efforts (4) mechanism 100d is used for applications like rotary valve actuation, it is required a body bottom connection with a valve for precision position, inward position control is provided with a pair of conical tips of screws, outward position are controlled by two flat tip screws, since the piston is not rotated unlike conventional helical actuator (5) mechanism 100e is used for lager torque output with limited axial space and precision position, with split bodies, the diameter of helical teeth can be made much larger without wasting lot material, since they are symmetric, it reduce the casting or forging mould cost, other application is used for spring return, it saves lot of money by reducing haft the spring sets in comparison with the conventional helical actuator with spring return devices, specially in subsea rotary valve applications, light weight, easy installation, versatility are the key requirements for a diver to install a valve system, the other advantage is top and button of connection can be interchanged for fail closed or fail open applications without changing any part.

Although the description above contains many specifications, these should not be construed as limiting the scope of the invention but as merely providing illustration of some of the presently preferred embodiments of this invention.

Thus, the scope of the invention should be determined by the appended claims and their legal equivalents, rather than by the examples given.

I claim:

1. An actuation module comprising;
(a) A body assembly having a body
(b) A shaft
(c) A conversion-transmission assembly operatively associated with said body and said shaft for converting movements between reciprocations and rotations of said shaft, wherein said body includes a left centric bore and a right centric bore in an opposite direction and an eccentric bore parallel to said left centric bore, said conversion-transmission assembly Includes a left piston and a right piston, said left piston Is movably disposed in said body and has a centric section movably engaged with said left centric bore and an eccentric section movably engaged with said eccentric bore, said right piston is movably disposed In said body and has a centric section movably engaged with said right centric bore and an eccentric section movably engaged with said eccentric bore, left helical teeth are provided in said left piston, right helical teeth are provided In said right piston, said shaft is movably positioned in said left piston and said right piston and has left helical teeth movably engaged with said left helical teeth of said left piston and right helical teeth movably engaged with said right helical teeth of said right piston, said body assembly further Including a left spherical cover and a right spherioal cover and a holder, wherein said body comprises a spherical shape and has a left port and a right port respectively connected to a pressurized fluid and a sink, said conversion-transmission assembly includes a left piston and a right piston , a center chamber between said left piston and said right piston is connected to said left port by a hole, a left side chamber between said left cover and said left piston and a right side chamber between said right cover and said right piston are connected to said right port by holes and two grooves, said holder has a bar extended to a shell with a spherical recess to secure said body.

2. The actuation module of claim 1, further including a conversion-transmission assembly operatively associated with said body and said shaft for converting movements between reciprocations and rotations of said shaft, wherein said body Includes at least a centric bore and at least an eccentric bore parallel to said centric bore, said conversion-transmission assembly includes at least a piston having a centric section movably engaged with said centric bore and an eccentric section movably engaged with said eccentric bore, said shaft movably positioned in said piston has at least a helical assembly , said piston has at least a helical mechanism movably engaged with said helical mechanism of said shaft.

\* \* \* \* \*